(12) United States Patent
Breukelaar et al.

(10) Patent No.: US 9,941,955 B2
(45) Date of Patent: Apr. 10, 2018

(54) OPTICAL NETWORK MONITORING AND PROTECTION USING A PHASED ARRAY SWITCHING ENGINE

(71) Applicant: Lumentum Operations LLC, Milpitas, CA (US)

(72) Inventors: Ian Breukelaar, Barrhaven (CA); Yi Liang, Ottawa (CA); Shane H. Woodside, Ottawa (CA); Barrie Keyworth, Stittsville (CA); Wayne Bonnet, Ottawa (CA); Peter David Roorda, Ottawa (CA); Brandon C. Collings, Middletown, NJ (US); Brian Smith, Stittsville (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/136,958

(22) Filed: Apr. 24, 2016

(65) Prior Publication Data

US 2016/0315697 A1    Oct. 27, 2016

Related U.S. Application Data

(60) Provisional application No. 62/152,141, filed on Apr. 24, 2015.

(51) Int. Cl.
*G02F 1/00* (2006.01)
*H04B 10/032* (2013.01)
(Continued)

(52) U.S. Cl.
CPC ........ *H04B 10/032* (2013.01); *H04J 14/0212* (2013.01); *H04J 14/0213* (2013.01);
(Continued)

(58) Field of Classification Search
CPC .... H04J 14/0212; H04J 14/02; H04J 14/0221; H04B 10/032; H04B 10/035;
(Continued)

(56) References Cited

U.S. PATENT DOCUMENTS

| 5,777,763 A * | 7/1998 | Tomlinson, III ..... G02B 6/2931 385/18 |
| 7,092,599 B2 | 8/2006 | Frisken |

(Continued)

OTHER PUBLICATIONS

J. Schroder et al, "An Optical FPGA: Reconfigurable simultaneous multi-output spectral pulse-shaping for linear optical processing," https://www.osapublishing.org/oe/fulltext.cfm?uri=oe-21-1-690&id=248036, Jan. 7, 2013, 8 pages.
(Continued)

*Primary Examiner* — Hanh Phan
(74) *Attorney, Agent, or Firm* — Harrity & Harrity, LLP

(57) ABSTRACT

A method may include receiving, by a switching engine, an optical signal that includes a channel. The method may include applying, by the switching engine, a first beam steering grating to direct a first portion of the channel to a first output port. The method may include applying, by the switching engine, one or more second beam steering gratings to direct at least one of a second portion of the channel to a second output port, or a third portion of the channel to a photodetector. The third portion may be approximately less, in power, than 10 percent of the channel.

20 Claims, 14 Drawing Sheets

(51) Int. Cl.
*H04J 14/02* (2006.01)
*H04Q 11/00* (2006.01)

(52) U.S. Cl.
CPC ...... *H04J 14/0217* (2013.01); *H04Q 11/0005* (2013.01); *H04Q 11/0062* (2013.01); *H04Q 2011/003* (2013.01); *H04Q 2011/0026* (2013.01); *H04Q 2011/0037* (2013.01); *H04Q 2011/0081* (2013.01)

(58) Field of Classification Search
CPC .......... H04Q 11/0003; H04Q 11/0005; H04Q 11/0067; H04Q 11/0062; G02B 6/3546; G02B 6/356
USPC ...... 398/83, 79, 45, 48, 49, 82, 85, 87, 2, 3, 398/4, 5, 33, 38, 50, 51, 53, 56, 10, 13, 398/17, 25, 26, 27; 385/24, 37, 16, 17, 385/18
See application file for complete search history.

(56) References Cited

U.S. PATENT DOCUMENTS

| | | | |
|---|---|---|---|
| 7,725,027 B2 | 5/2010 | Keyworth et al. | |
| 7,787,720 B2 | 8/2010 | Frisken et al. | |
| 8,081,875 B2 | 12/2011 | Keyworth et al. | |
| 8,300,995 B2 | 10/2012 | Colbourne | |
| 8,705,960 B2 | 4/2014 | Colbourne | |
| 2001/0021045 A1* | 9/2001 | Tervonen | H04B 10/077 398/5 |
| 2006/0034610 A1* | 2/2006 | Akiyama | H04J 14/0204 398/83 |
| 2008/0219663 A1* | 9/2008 | Yuan | G02B 6/2931 398/48 |
| 2010/0027995 A1* | 2/2010 | Farley | G02B 6/351 398/49 |
| 2010/0150558 A1 | 6/2010 | Wisseman | |
| 2012/0219293 A1* | 8/2012 | Boertjes | H04J 14/0204 398/48 |
| 2013/0209031 A1 | 8/2013 | McLaughlin et al. | |
| 2014/0255026 A1 | 9/2014 | Roorda et al. | |
| 2016/0316281 A1 | 10/2016 | Keyworth et al. | |

OTHER PUBLICATIONS

G. Baxter et al, "Highly Programmable Wavelength Selective Switch Based on Liquid Crystal on Silicon Switching Elements," http://m.ece.queensu.ca/Current-Students/Graduate/Course-Homepages/ELEC863_Winter2011/files/Baxter_OFC2006_OTuF2.pdf, Mar. 5, 2006, 3 pages.
T. Zami, "Can the limits of the 'contentionless' add/drop stages degrade importantly the benefit of superchannels in the WDM networks?," https://www.researchgate.net/publication/295148583_Can_the_limits_of_the_contentionless_adddrop_stages_degrade_importantly_the_benefit_of_superchannels_in_the_WDM_networks, Sep. 21, 2014, 3 pages.
M. Roelens et al., "Applications of LCoS-Based Programmable Optical Processors," Proc. OFC, paper W4F3, 2014.
X. Wang et al., "A Hitless Defragmentation Method for Self-optimizing Flexible Grid Optical Networks," http://grid.cs.gsu.edu/cao/iwon/iWON13%20Node%20Arch%20Defrag%2020131202-1253_v2.pdf, Dec. 9, 2013, 17 pages.
P.D. Colbourne et al., "ROADM Switching Technologies" in Optical Fiber Communication Conference, OSA Technical Digest, Optical Society of America, Paper OTuD1, 2011, 43 pages.
X. Lui et al., "Superchannel for Next-Generation Optical Networks," in Optical Fiber Communication Conference, OSA Technical Digest, Optical Society of America, Paper W1H.5, 2014, 33 pages.
Finisar, "WaverShaper Family of Programmable Optical Processors," https://www.finisar.com/sites/default/files/downloads/waveshaper_family_of_programmable_$_{optical\_}$processors_12_page_brochure_2015_web_3.pdf, Sep. 2015, 12 pages.
Roelens et al., "Applications of LCoS-Based Programmable Optical Processors", Optical Fiber Communication Conference. Optical Society of America, Mar. 9, 2014, 3 pages.
Schröder et al., "An Optical FPGA: Reconfigurable Simultaneous Multi-Output Spectral Pulse-Shaping for Linear Optical Processing", Opt. Express 21, Jan. 7, 2013, pp. 690-697.

* cited by examiner

OPTICAL NETWORK MONITORING AND PROTECTION USING A PHASED ARRAY SWITCHING ENGINE

RELATED APPLICATION

This application claims priority under 35 U.S.C. § 119 to U.S. Provisional Patent Application No. 62/152,141, filed on Apr. 24, 2015, the content of which is incorporated by reference herein in its entirety.

TECHNICAL FIELD

The present disclosure relates to devices and systems for communication in an optical network. More particularly, the present disclosure relates to measuring performance of optical links and improving optical network performance using an optical phased array switching engine.

BACKGROUND

In optical networks, signals may be transmitted at various wavelengths, with each wavelength corresponding to a transmission channel. Optical links may connect network nodes so that signals may be transmitted throughout the optical network. An optical route may use a series of network nodes and optical links to connect a source of an optical transmission with a destination for the optical transmission.

As optical link bandwidth demand increases, reconfigurable optical add-drop multiplexers (ROADMs) have seen increasing usage as optical nodes. An optical network that is implemented using ROADMs can be reconfigured without physical modification of components of the ROADMs, which improves flexibility and peak bandwidth of the optical network. A ROADM may include a wavelength selective switch (WSS), which includes a switching array that routes optical signals to particular output ports based on wavelengths of the optical signal.

SUMMARY

A method may include receiving, by a switching engine, an optical signal that includes a channel. The method may include applying, by the switching engine, a first beam steering grating to direct a first portion of the channel to a first output port. The method may include applying, by the switching engine, one or more second beam steering gratings to direct at least one of a second portion of the channel to a second output port, or a third portion of the channel to a photodetector. The third portion may be approximately less, in power, than 10 percent of the channel.

A method may include receiving, by an optical device, a first optical signal and a second optical signal. The first optical signal may include a first portion of a channel and being received on a first port, and the second optical signal may include a second portion of the channel and being received on a second port. The method may include measuring, by the optical device, a power level of at least one of the first portion or the second portion. The method may include selecting, based on the power level, one of the first portion or the second portion, as a selected portion, to be directed by the optical device to an output port of the optical device.

A method may include receiving, by a switching engine, an optical signal including one or more optical channels. The method may include applying, by the switching engine, one or more first beam steering gratings to direct one or more respective first portions of the one or more optical channels to respective output ports. The method may include applying, by the switching engine, one or more second beam steering gratings to direct one or more second portions of the one or more optical channels to one or more photodetectors. The method may include determining, by the switching engine, a channel power measurement for at least one optical channel, of the one or more optical channels, using the one or more photodetectors. The method may include performing an action based on the channel power measurement.

DETAILED DESCRIPTION

Figure 1A:
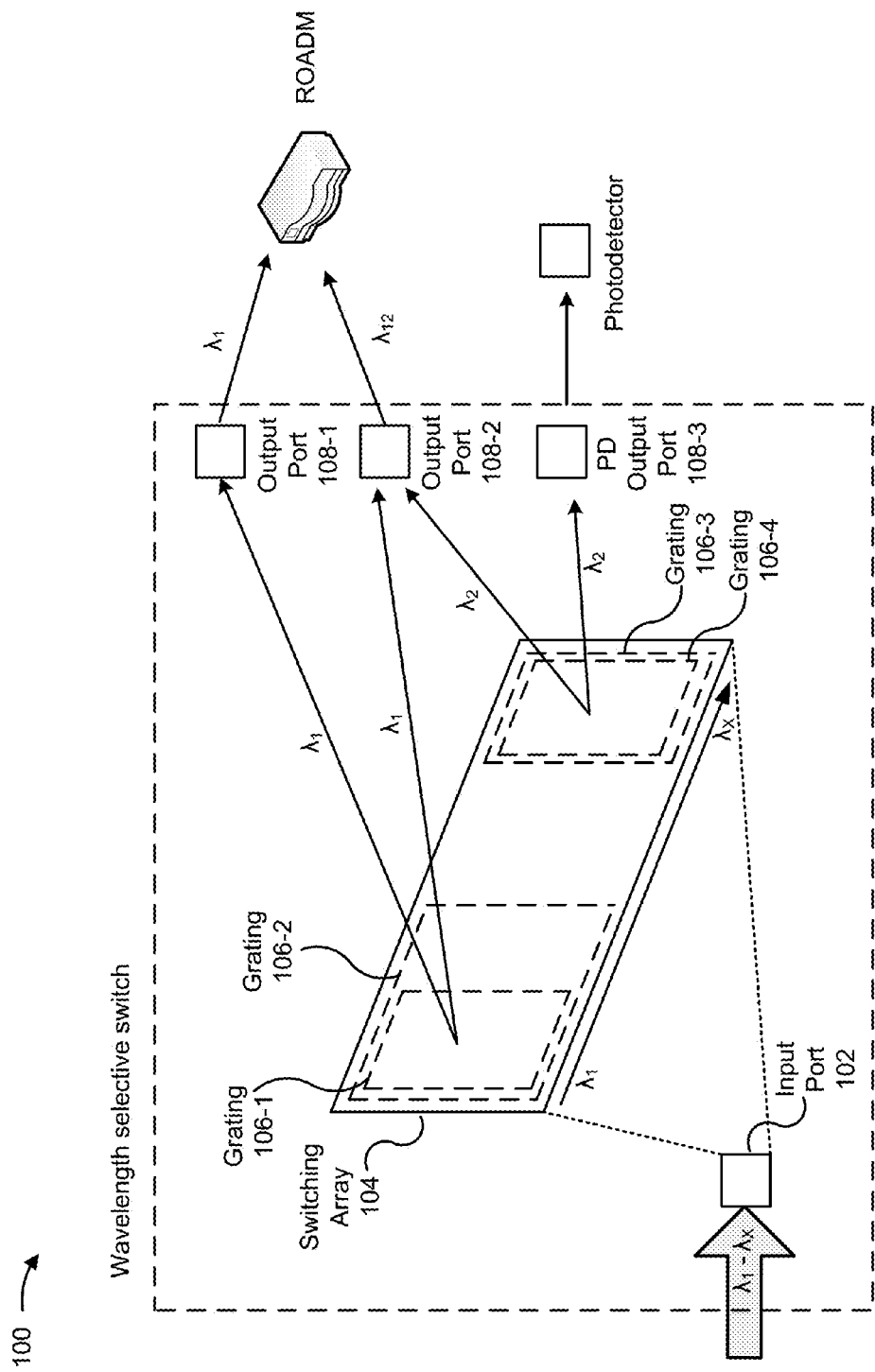
FIGS. 1A-1C are diagrams of an overview of an example implementation described herein.

The following detailed description of example implementations refers to the accompanying drawings. The same reference numbers in different drawings may identify the same or similar elements.

An optical network may include optical nodes that route, carry and/or provide network traffic via optical links using optical signals. In some cases, the optical nodes may include reconfigurable optical add-drop multiplexers (ROADM), which can add, drop, pass, or redirect modulated optical signals of various wavelengths, and which can be reconfigured by a controller (e.g., a local controller, a remote controller, a network administrator device, etc.) to change treatment of optical signals by the optical network. A ROADM may include one or more wavelength selective switches (WSS) that can route an optical signal based on a wavelength of the optical signal. In some cases, a ROADM may include a component to multiplex or demultiplex optical signals, such as a multicast switch, a WSS that is capable of multiplexing optical signals, such as a 1×N WSS, an M×N WSS, a microelectromechanical mirror (MEMS) WSS, a liquid crystal (LC) WSS, a liquid crystal on silicon (LCoS) WSS, etc.), or the like.

An optical signal may include a single optical channel (also referred to herein as an optical channel or a carrier), or may include multiple optical channels that are multiplexed together using a wavelength division multiplexing (WDM) process, which increases the bandwidth that can be transmitted via an optical link. For example, an optical signal may include a WDM signal, a Coarse WDM (CWDM) signal, a Dense WDM (DWDM) signal, or other optical signals with one or more wavelength components. An optical channel may include an optical signal having data modulated on wavelengths around a center frequency. A wavelength component is a portion of an optical signal that is centered around a particular optical frequency.

In some cases, optical nodes of an optical network may encounter degraded or disrupted service based on a line cut, a malfunctioning optical device, interference, an unusually long optical link, or the like. When the optical node detects degraded or disrupted service, the optical node may try to identify an alternative optical path to route the network traffic.

However, detecting degraded or disrupted service and causing, from the optical transport layer, network traffic to be routed along the new optical path may be time consuming. For example, to reroute network traffic along the different optical path, the optical network (e.g., a controller associated with the optical network) may check the optical network for available resources to route the protection path before it can be configured, and may provision a new path, which may involve reconfiguring the optical node, or other optical devices along the first optical path, the second optical path, or other optical paths.

When network traffic delivered over an optical network must achieve well defined, stringent service level agreements (SLAs) relating to the amount of downtime permitted during failure or maintenance operations, protection switching (allowing network traffic to recover from a disruption) is typically deployed above the optical network layer (i.e., at Layer 1 or above). Layer 0 (i.e., the optical transport layer) has typically not been used for fast recovery. Fast recovery may be required to meet such stringent SLA downtime requirements.

Optical Transport Layer restoration techniques that have been proposed are dependent on the use of dynamic reconfigurability in mesh networks based on 'directionless' ROADM (Reconfigurable Optical Add Drop Multiplexer) technology. ROADMs with directionless capability are able to autonomously redirect a wavelength from one direction to any other direction to bypass a fiber cut or similar failure.

Restoration based on directionless capabilities in a ROADM may require certain operations to be performed before the traffic is switched including: determination of the available wavelengths along the new path, retuning the transponder to match the available wavelength (if different from the original wavelength), invoking wavelength routing commands to the appropriate ROADMs along the path, turning up the wavelength gracefully to avoid unwanted system transient effects, and other operations. Completing these operations can be time consuming and can delay the recovery of a fully available optical path.

Implementations described herein permit a WSS that is capable of performing programmable multicast beam steering to create optical transport layer (e.g., Layer 0) redundancy in a 1+1 optical protection scheme, and/or, as will be described later, to monitor optical channels without requiring a dedicated optical channel monitor. By using reconfigurable multicast beam steering gratings, the WSS can controllably divide selected wavelength components or channels or sub-channels of the optical signal and use a portion of the divided optical signal in a 1+1 optical protection or for channel monitoring.

A 1+1 optical protection scheme uses a working path and a protection path through the optical network where the two paths are different at the optical transport layer and where both paths are operational in the optical network. The WSS at the receiving optical node can then select one of the two paths on which to receive the optical signal. This is also a form of 1+1 broadcast and select protection. Given that the working and protection optical paths are provisioned and operational, switching paths may occur at the speed at which the receiving WSS can change selection between the two paths. The WSS at the transmitting optical node can use multicast beam steering gratings, or multiple beam steering gratings applied to a region of the switching array, to transmit portions of the optical signal on the working path and the protection path. In advance of transmission, the optical network may provision these paths as it would normally provision an optical link through the optical network.

By using multicast beam steering gratings to implement a 1+1 optical protection scheme, the WSS improves optical network resilience and reduces time and processing resources required to switch from a working path to a protection path. For example, a receiving ROADM may determine that an optical signal provided via the working path is degraded, and may instead use an optical signal provided via the protection path. The optical signals via the working path and the protection path may be provided substantially simultaneously, which reduces a delay between detecting that service is degraded and switching to the protection path. In some cases, implementations described herein may be capable of providing 1+1 optical transport layer protection for optical signals received from a single device on a single input port. Thus, implementations described herein improve network resilience.

Furthermore, implementations described herein also permit the WSS to direct a portion of an optical signal to a photodetector that is included in a ROADM or to an output port connected to a photodetector. The photodetector may provide an optical power measurement for the portion of the optical signal, permitting optical channel monitoring. Similar to the implementation of 1+1 protection, the WSS may apply multicast beam steering gratings or multiple beam steering gratings to a region of the switching array corresponding to the wavelength component (or components) to be monitored. By facilitating optical channel monitoring using the photodetector, the WSS reduces size and cost of the ROADM and/or may eliminate the need for an independent optical channel monitor.

Both 1+1 protection and optical channel monitoring may be implemented in the same WSS and may be implemented for the same wavelength components or channels inside the WSS. For example, 1+1 protection may divide the optical signal selected to be protected into equal parts on the working path and the protection path while, the optical channel monitoring may divide a selected optical signal so a small percentage, for example, approximately 1 percent to 8 percent or approximately 3 percent to 5 percent, would be split to the photodetector. In some implementations, a wavelength component of the optical signal may be divided so that a small percentage is directed to the photodetector (optionally via an output port of the WSS) and the remaining light is divided equally between a working path and a protection path.

Figure 1B:
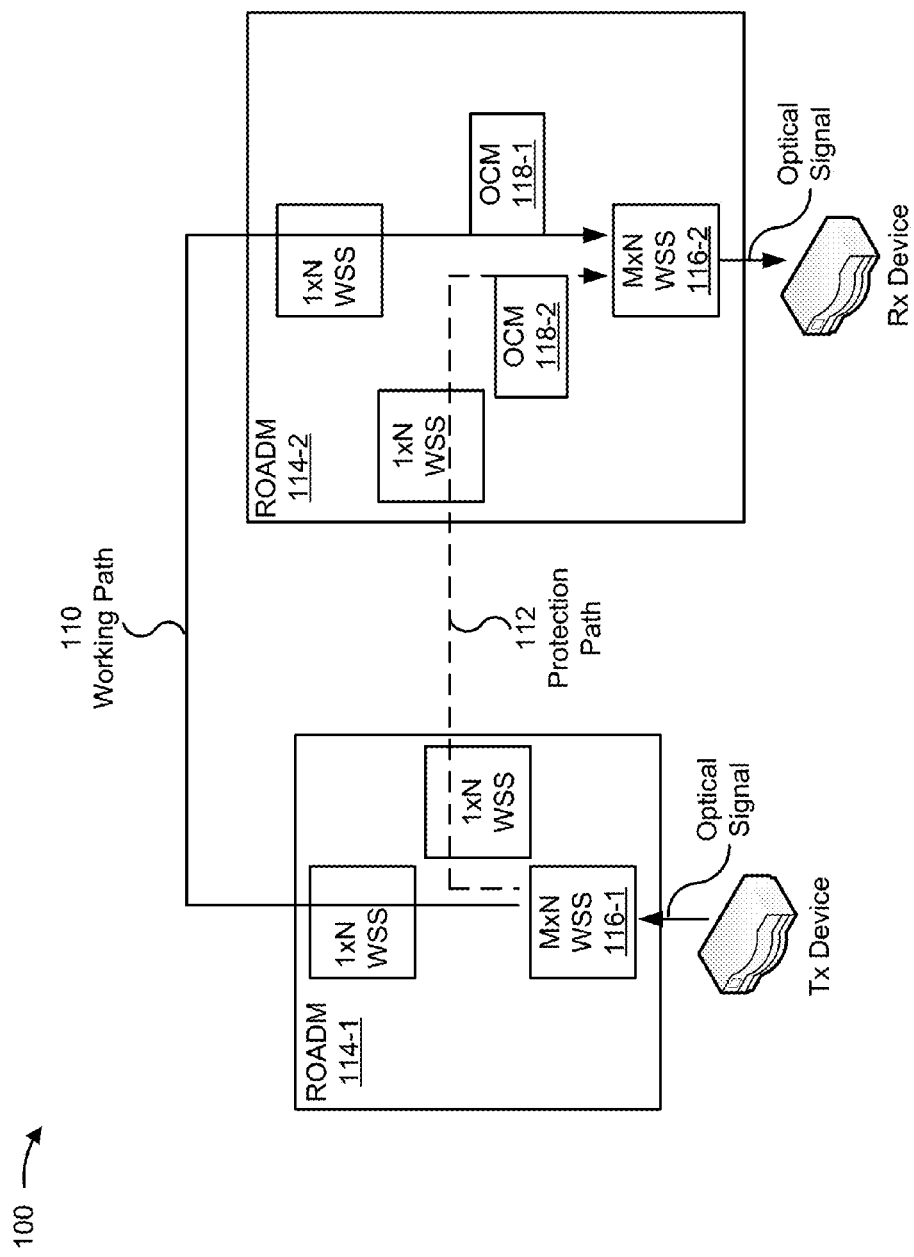
Figure 1C:
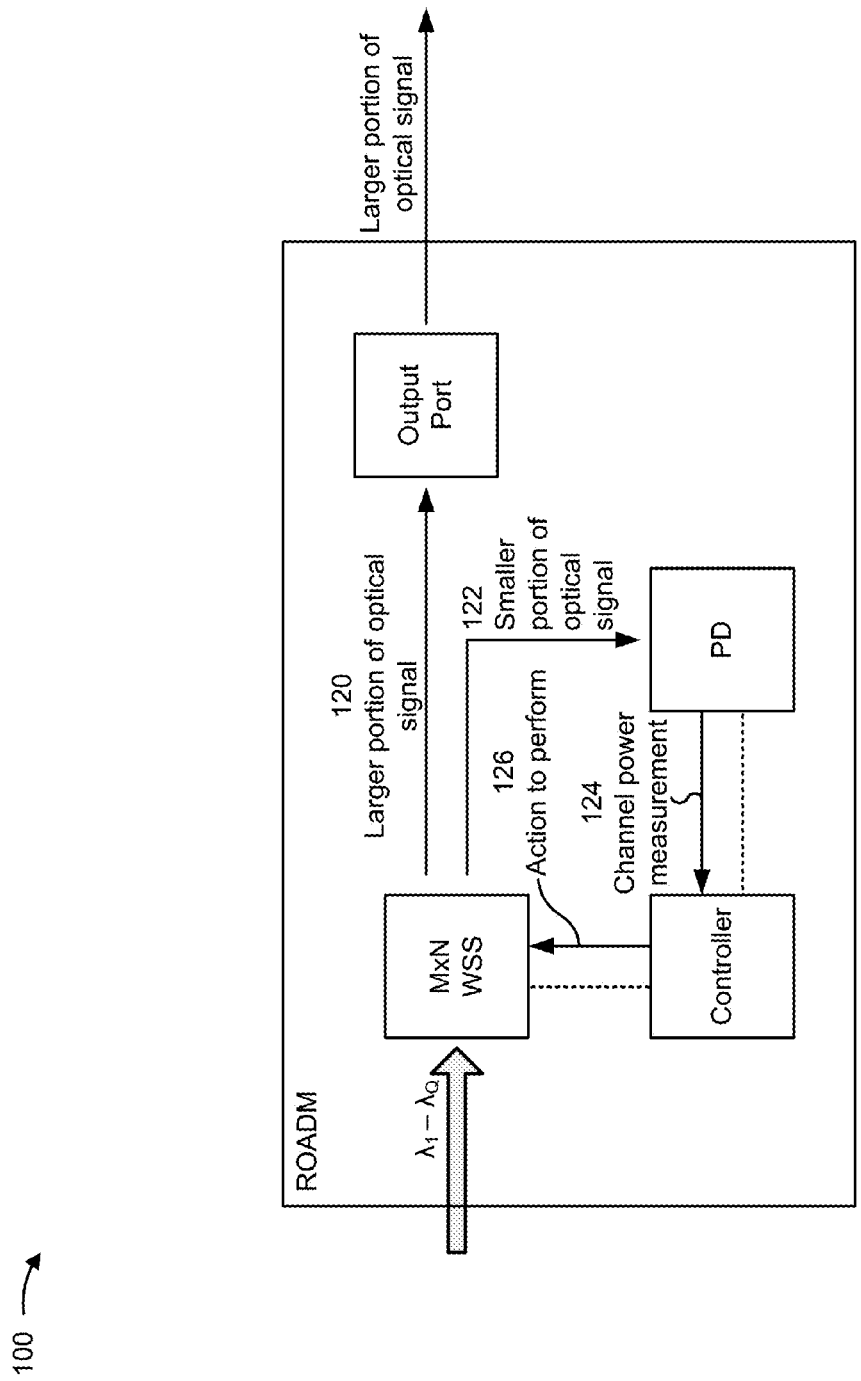

FIGS. 1A-1C are diagrams of an overview of an example implementation 100 described herein. FIG. 1A describes a WSS that can perform multicast beam steering using a phased array switching engine. As shown in FIG. 1A, and by reference number 102, an input port 102 of a WSS may receive an optical signal that includes a set of wavelengths (e.g., $\lambda_1$ to $\lambda_X$). In some implementations, input port 102 may be a single, common input port 102 for the WSS. In some implementations, input port 102 may include one or more of a set of input ports of the WSS.

As further shown, the WSS may spatially distribute the optical signal based on wavelengths included in the optical signal. For example, the WSS may include one or more distribution components (e.g., a diffractive grating, a prism, a grism, etc.) that spatially distribute the optical signal into a distributed optical signal based on the wavelengths. The distributed optical signal may include a set of spatially separated wavelength components. As further shown, the distributed optical signal may be projected onto a switching engine (not illustrated) including switching array 104. As shown, the wavelengths include $\lambda_1$, shown on a left side of switching array 104, through $\lambda_X$, shown on a right side of switching array 104. Implementations described herein may apply 1+1 protection and/or optical channel monitoring to any of the wavelength components. In an WSS using LCoS technology, switching array 104 may include pixels, and a group of pixels may be programmable by applying a grating profile to the pixels to create a single-cast beam steering grating or a multicast beam steering grating (e.g., gratings 106-1 through 106-4).

While implementations described herein are primarily described in relation to an LCoS switching engine, implementations described herein are not limited to an LCoS switching engine, and may be implemented using a MEMS switching engine array or another type of switching engine capable of programmable multicast beam steering.

The distributed optical signal may be projected to switching array 104 such that wavelength of the distributed optical signal increases along a horizontal axis of switching array 104, and columns of pixels, or groups of columns of pixels, may be programmable to impart a tilt to a wavelength component that is incident on the column or group of pixels. A particular optical channel may be incident on a region of pixels, for example, six columns of pixels, ten columns of pixels, or another quantity of columns of pixels. To impart tilt, a region of pixels may be programmed with a periodic blazed grating changing the phase of the incident wavelength component that causes a particular diffraction order of light to be reflected or transmitted at an angle. The tilt imparted to a wavelength component may cause the wavelength component to be directed to a selected output port 108 or a group of output ports 108 if the region of pixels was provided a multi-cast beam steering grating profile (i.e., multiple grating profiles overlap on the same area of a region of pixels).

When an optical signal is directed to multiple output ports 108, switching array 104 may be capable of controlling relative portions of the optical signal that are directed to each of the multiple output ports 108. For example, switching array 104 may divide the optical signal evenly among the multiple output ports 108, or may cause more of the optical signal to be directed to a first output port 108 than a second output port 108.

Gratings 106-1 and 106-2 are shown as being applied to overlapping areas of pixels of switching array 104 in FIG. 1A, which causes $\lambda_1$ to be directed to output ports 108-1 and 108-2. To overlap multiple gratings 106, an area of pixels may be programmed with two or more superimposed blazed gratings. For example, to multicast a selected wavelength component to four ports, four overlapping gratings 106, one for directing light to each port, may be programmed on region of pixels of the switching array 104 corresponding to the selected wavelength component. By directing $\lambda_1$ to output ports 108-1 and 108-2, switching array 104 provides 1+1 optical transport layer protection for $\lambda_1$.

As shown, $\lambda_1$ and $\lambda_2$ are both directed to output port 108-2 by gratings 106-1 through 106-4 to form a multiplexed optical signal $\lambda_{12}$. Multiplexed optical signal $\lambda_{12}$ may include a super-channel and/or an optical signal including multiple carriers with one or more channel gaps between the multiple carriers. As further shown, a portion of $\lambda_2$ is directed to PD output port 108-3, and is outputted to a photodetector. The photodetector includes a light sensor, such as a photodiode, or the like. In some implementations, a ROADM and/or a WSS may be associated with multiple photodetectors. The photodetector may be connected to an output port of the wavelength selective switch, or may be included in the wavelength selective switch.

The photodetector may generate a current based on an optical channel power of $\lambda_2$, and the wavelength selective switch, or another component of a ROADM that includes the wavelength selective switch, may perform an action based on the generated current. In some implementations, the power of the portion of $\lambda_2$ that is directed to the photodetector may be relatively small as compared to the power of $\lambda_2$ (e.g., may be approximately 8 percent, approximately 5 percent, approximately 1 percent, etc. of the power of $\lambda_2$). In this way, a portion of an optical channel (i.e., $\lambda_2$) is directed to PD output port 108-2 using programmable beam steering gratings.

FIG. 1B shows an example of providing an optical signal via a working path 110 and a protection path 112. As shown, a transmitter device (Tx device) transmits an optical signal to ROADM 114-1. As further shown, M×N WSS 116-1 of ROADM 114-1 receives the optical signal. Assume that the optical signal is associated with information indicating that the optical signal is to be routed toward ROADM 114-2. Assume further that M×N WSS 116-1 includes a phased array switching engine or a programmable multi-cast switching engine.

The phased array switching engine of M×N WSS 116-1 may direct a first portion of the optical signal via working path 110 and may direct a second portion of the optical signal via protection path 112. In some implementations, the first portion may be substantially equal in optical intensity to the second portion, which simplifies processing of the optical signal by ROADM 114-2 and/or a receiver device (Rx device) associated with ROADM 114-2. ROADM 114-1, or a network administrator device, may select and/or provision working path 110 and protection path 112 based on path performance information, network topology information, or the like. ROADM 114-1 may provide, to ROADM 114-2, information identifying working path 110 and protection path 112 (e.g., via an optical supervisory channel).

Based on the information identifying working path 110 and protection path 112, ROADM 114-2 may obtain channel power measurements for working path 110 and/or protection path 112. For example, ROADM 114-2 may obtain a channel power measurement relating to an optical signal carried by working path 110 from OCM 118-1, and may obtain a channel power measurement relating to an optical signal carried by protection path 112 from OCM 118-2. In some implementations, OCM 118 may include a photodetector that is internal to ROADM 114-2, as described in more detail in connection with FIG. 1C, below or OCM 118 may be replaced by configuring the 1×N WSSes according to channel monitoring implementations described herein and adding one or more photodetectors. Additionally, or alternatively, OCM 118 may be external to ROADM 114-2.

Based on the channel power measurements, ROADM 114-2 may select either working path 110 or protection path 112 as a selected path. For example, ROADM 114-2 may select the selected path based on the corresponding optical signal having a higher optical intensity, a better optical signal to noise ratio (OSNR), fewer bit errors, or the like. ROADM 114-2 may provide the optical signal to the Rx device from the selected path. In a situation where ROADM 114-2 determines that the optical signal from the selected path has degraded or has been interrupted, ROADM 114-2 may provide the optical signal to the Rx device from the path other than the selected path. For example, a WSS of ROADM 114-2, such as the M×N WSS 116-2 may switch the Rx device from a port associated with the selected path to a port associated with the path other than the selected path.

In this way, ROADMs 114-1 and 114-2 provide a 1+1 optical layer protection scheme using a phased array switching engine or a programmable multicast switching engine, which reduces delay in switching from a working path to a protection path and improves resilience of the optical network. Furthermore, the switching engine may provide 1+1 optical layer protection for optical signals received from a single device and via a single input port, which may not be possible with a multicast switch, or the like. Still further, the receiving ROADM 114-2 can implement channel monitoring in one or more WSSes associated with the receiving ROADM 114-2 using the same multicasting implementations, by splitting a small percentage of the monitored optical signal to a photodetector instead of splitting equally on two paths.

FIG. 1C shows a diagram of an example of determining an optical channel power measurement (i.e. channel monitoring) using an integrated photodetector associated with a ROADM. As shown in FIG. 1C, a WSS of a ROADM (e.g., an M×N WSS or a 1×N WSS) may receive an optical signal including a range of wavelengths $\lambda_1$ through $\lambda_Q$. As shown by reference number 120, the WSS may direct a larger portion of the optical signal (e.g., 70%, 90%, 95%, 97%, 99%, etc.) to an output port of the ROADM. As shown by reference number 122, the WSS may direct a smaller portion of the optical signal to a photodetector associated with the ROADM (e.g., included in the ROADM, connected to the ROADM, etc.). For example, the WSS may use a multicast beam steering grating to direct the larger portion to the output port, and to direct the smaller portion to the photodetector. The smaller portion may include all of or a subset of the wavelength components (i.e. channels) of the optical signal.

As shown by reference number 124, the photodetector may provide an optical channel power measurement to a controller of the ROADM. The optical channel power measurement may include a measurement of optical intensity of the smaller portion of the optical signal. As shown by reference number 126, based on the optical channel power measurement, the controller may cause the WSS, ROADM, or another optical device in the optical network to perform an action. For example, the controller may cause the WSS to switch the optical signal to another port, to stop directing the smaller portion of the optical signal to the photodetector, to change which portion of the optical signal is provided to the photodetector, or the like.

Figure 2A:
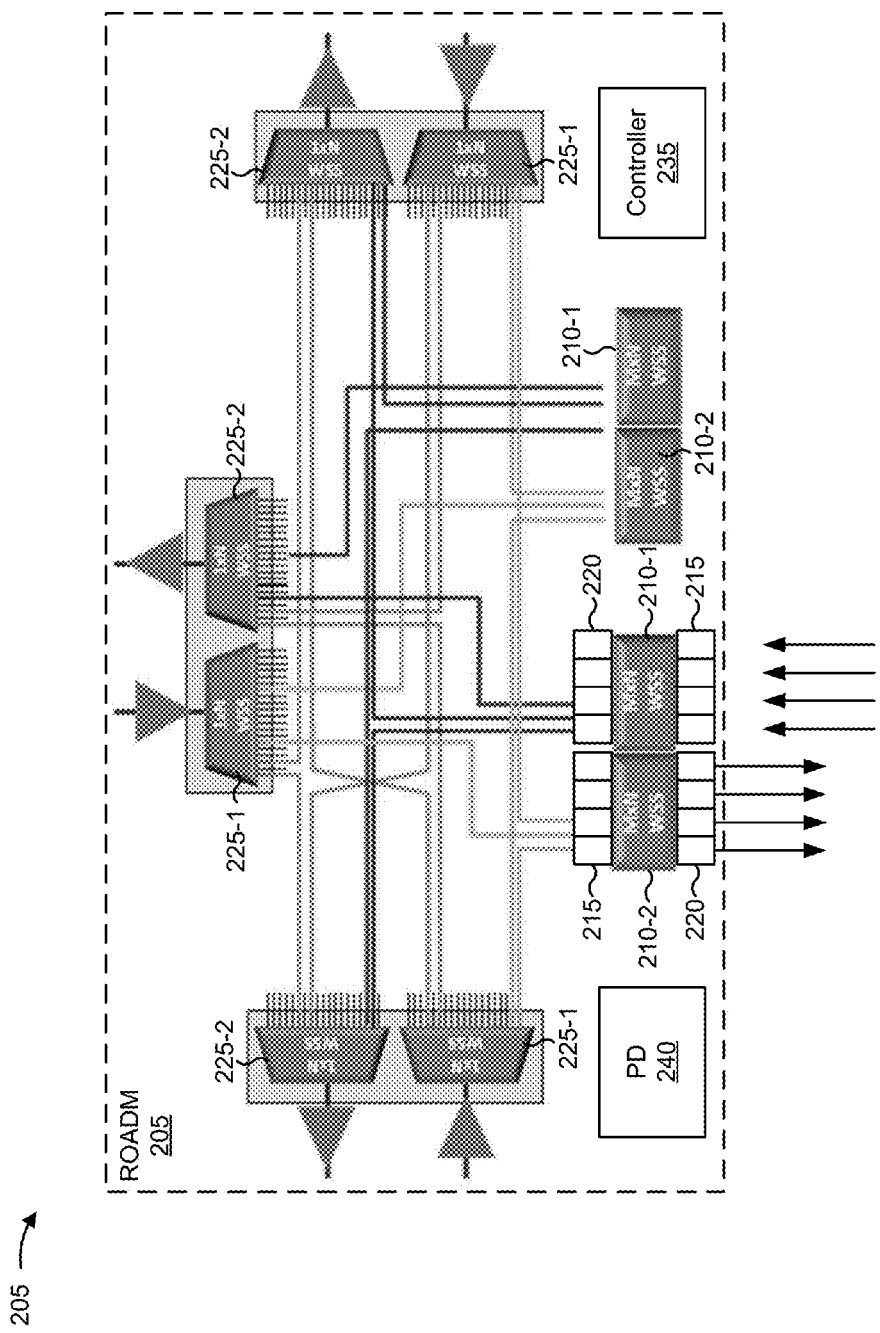
FIG. 2A is a diagram of an example implementation of a reconfigurable optical add-drop multiplexer.

In this way, the WSS and the photodetector perform an optical channel monitoring function using a phased array switching engine or a programmable multicast switching engine, which may be less expensive and simpler to implement than a discrete OCM. FIG. 2A is a diagram of an example ROADM 205 that may include implementations described herein. A ROADM 205 is but one example of an optical node or optical device that may include implementations described herein. As shown, ROADM 205 includes one or more M×N WSS 210, one or more 1×N WSS 225, and a controller 230. As shown, the M×N WSS 210-1 and 210-2 are associated with input ports 215 and output ports 220; however, any of the 1×N WSS 225 may be associated with input ports 215 and output ports 220 or may have the same structure as described in respect of FIG. 1A or 2B. ROADM 205 may receive incoming optical channels already in the optical network through the 1×N WSSes 225-1 and route them in different directions through 1×N WSSes 225-2. ROADM 205 may add optical channels to the optical network through M×N WSS 210-1, and/or may drop optical channels from the optical network (i.e. to a local network, to a data center, or to another optical network component) through M×N WSS 210-2. Redundant add/drop M×N WSSes 210-2 and 210-1 may be provided, as illustrated, to be provisioned in case of failure of the primary add/drop M×N WSSes 210-2 and 210-1. Alternatively or additionally, the second bank of add/drop M×N WSSes 210-2 and 210-1 may be provisioned to allow more optical channels to be added or dropped at this ROADM 205.

ROADM 205 may multiplex, de-multiplex, add, drop, and/or route multiple optical channels into and/or out of the optical network. An optical channel may include, for example, an optical sub-carrier, an optical carrier, a data optical channel, an optical super-channel, or a combination of one or more of the above and/or another kind of channel. In some cases, M×N WSS 210-2 of ROADM 205 may drop an optical signal, and may allow one or more other optical signals to continue propagating toward a receiver/transceiver device. The dropped optical signal may be provided to a device (not shown) that may demodulate and/or otherwise process the dropped optical signal to output the data stream carried by the dropped optical signal.

In some cases, M×N WSS 210-1 of ROADM 205 may add an optical signal to the optical network. The added optical signal and the other optical signals, other than the dropped optical signal, may propagate to other ROADMs 205 in the optical network). M×N WSS 210-1 may be referred to herein as an add M×N WSS 210, and M×N WSS 210-2 may be referred to herein as a drop M×N WSS 210.

M×N WSS 210 may be associated with a set of input ports 215 and a set of output ports 220. An optical signal can be provided from any one or more of the set of input ports 215 to any one or more of the set of output ports 220 by M×N WSS 210. For example, M×N WSS 210 may include a phased array switching engine (e.g., an LCoS switching engine). In some implementations, phased array switching engines may be programmable. In some implementations, M×N WSS 210 may multicast an optical signal from a single input port 215, and may provide sub-signals to one or more output ports 220.

1×N WSS 225-1 may receive optical signals inbound to ROADM 205 (i.e. from within the optical network), and may switch the optical signals to one or more M×N WSS 210 (e.g., to be dropped or routed to 1×N WSS 225-2) and/or 1×N WSS 225-2. That is, 1×N WSS 225-1 may receive inbound optical signals from other optical nodes of the optical network, and 1×N WSS 225-2 may provide outbound optical signals to other optical nodes of the optical network.

As shown, ROADM 205 may include controller 230. Controller 230 may include a device capable of performing operations related to configuring and operating ROADM 205. For example, controller 230 includes a processor in the form of, for example, a central processing unit, a microprocessor, a digital signal processor, a microcontroller, a field-programmable gate array, an integrated circuit (e.g., an application-specific integrated circuit), or another form of processor. Controller 230 is implemented in hardware, firmware, or a combination of hardware and software. In some implementations, controller 230 may include one or more processors capable of being programmed to perform a function. Controller 230 may also include a memory, such as a random access memory (RAM), a read only memory (ROM), and/or another type of dynamic or static storage device (e.g., a flash memory, a magnetic memory, an optical memory, etc.) that stores information and/or instructions for use by controller 230.

The memory of controller 230 may include data defining different beam steering grating profiles to be applied to different regions of pixels of switching array 250. Controller 230 may include instructions, hardware or firmware, or the like for applying the beam steering grating profiles to switching array 250, overlapping grating profiles on regions of pixels, or updating the grating profiles.

Controller 230 may configure M×N WSS 210 or another component of ROADM 205 (e.g., 1×N WSS 225, etc.) to add, drop, or route optical signals. For example, controller 230 may cause M×N WSS 210 to implement one or more single-cast or multicast beam steering gratings.

Photodetector 240 may include a component that generates a current based on a power level of light incident on photodetector 240, such as a photodiode, or the like. Photodetector 240 may provide the generated current to controller 230 or another device.

Figure 2B:
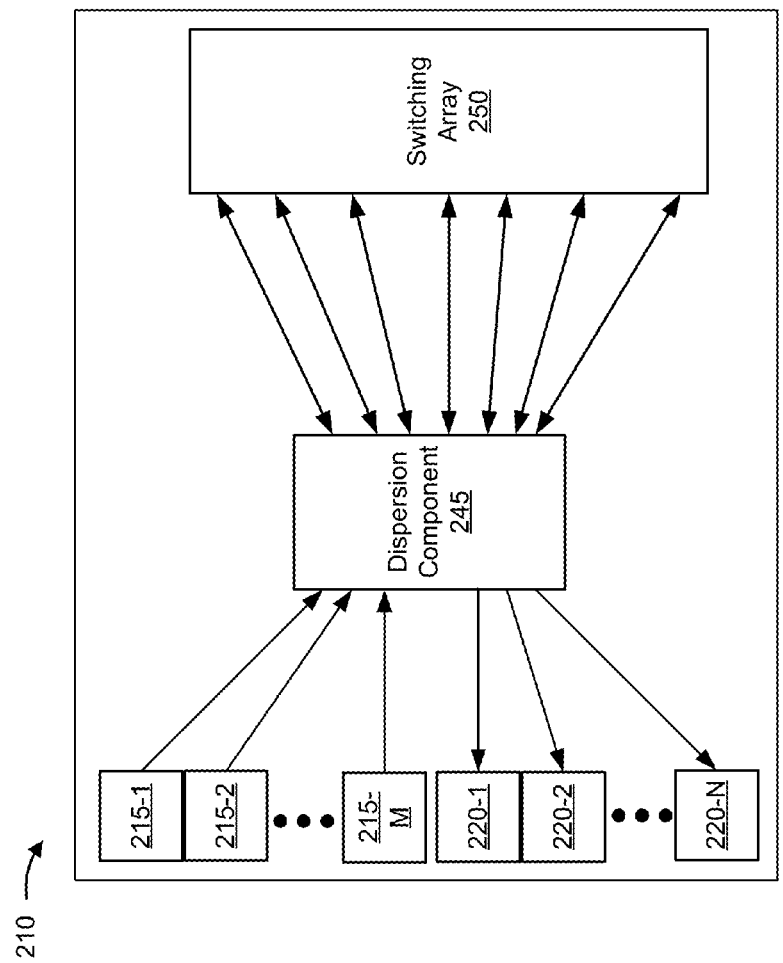
FIG. 2B is a diagram of an example M×N wavelength selective switch that may be included in a reconfigurable optical add-drop multiplexer.

FIG. 2B is a diagram of example components of M×N WSS 210 that includes a switching array. As shown, M×N WSS 210 includes one or more input ports 215-1 through 215-M, one or more output ports 220-1 through 220-N, a dispersion component 245, and a switching array 250. Other optical, electrical, mechanical and environmental components may also be included within the M×N WSS 210, for example, lenses, a spherical mirror, a thermistor, a hermetic housing, moisture getter, particular mixtures of gasses and electrical and optical feedthroughs.

Dispersion component 245 may include, for example, a diffractive grating, a prism, a grism, or the like. Dispersion component 245 receives one or more input optical signals from input port 215. Dispersion component 245 disperses the one or more input optical signals into a distributed optical signal, comprised of spatially separated wavelength components, in a wavelength direction. For example, dispersion component 245 may impart a particular angular separation to the wavelength components to cause the wavelength components to be spatially distributed along the wavelength direction.

Switching array 250 includes independently controllable elements (e.g., pixels, etc.) that are spatially separated in the wavelength direction. Each switching array element may receive some of a different wavelength component, of the spatially separated wavelength components, and may steer the corresponding wavelength component in a switching direction. For example, the wavelength direction may be orthogonal to the switching direction. Switching array 250 may cause the wavelength components to be directed (e.g., reflected, passed, etc.) back to dispersion component 245 (or to another dispersion component) at different angles in the switching direction. For example, a first wavelength component may be directed at an upward angle to cause the first wavelength component to couple with a first output port 220, and a second wavelength component may be directed at a downward angle to cause the second wavelength component to couple with a second output port 220. If the switching array 250 multicasts a wavelength component, then the wavelength component incident on the region with multicast gratings is divided onto multiple angular paths.

After receiving the wavelength components from switching array 250, dispersion component 245 may combine the wavelength components in the wavelength direction. For example, if dispersion component 245 imparted an angular divergence to disperse the wavelength components, dispersion component 245 may impart an angular convergence to cause the wavelength components to return to an original dispersion state in the wavelength direction. Dispersion component 245 may direct the wavelength components to output ports 220.

After the wavelength components are combined in the wavelength direction, the wavelength components retain the deflections in the switching direction imparted by switching array 250. Thus, the wavelength components reach output ports 220 separated only in the switching direction and couple into different output ports 220 based on how each wavelength component was steered by the corresponding element of switching array 250. The above M×N WSS description is equally applicable to a 1×N WSS (i.e. M=1). Internal configurations of WSSes other than those described above are equally applicable.

The number and arrangement of devices and networks shown in FIGS. 2A and 2B are provided as an example. In practice, there may be additional devices, fewer devices, different devices, or differently arranged devices than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices shown in FIGS. 2A and 2B may perform one or more functions described as being performed by another set of devices shown in FIGS. 2A and 2B.

Figure 3:
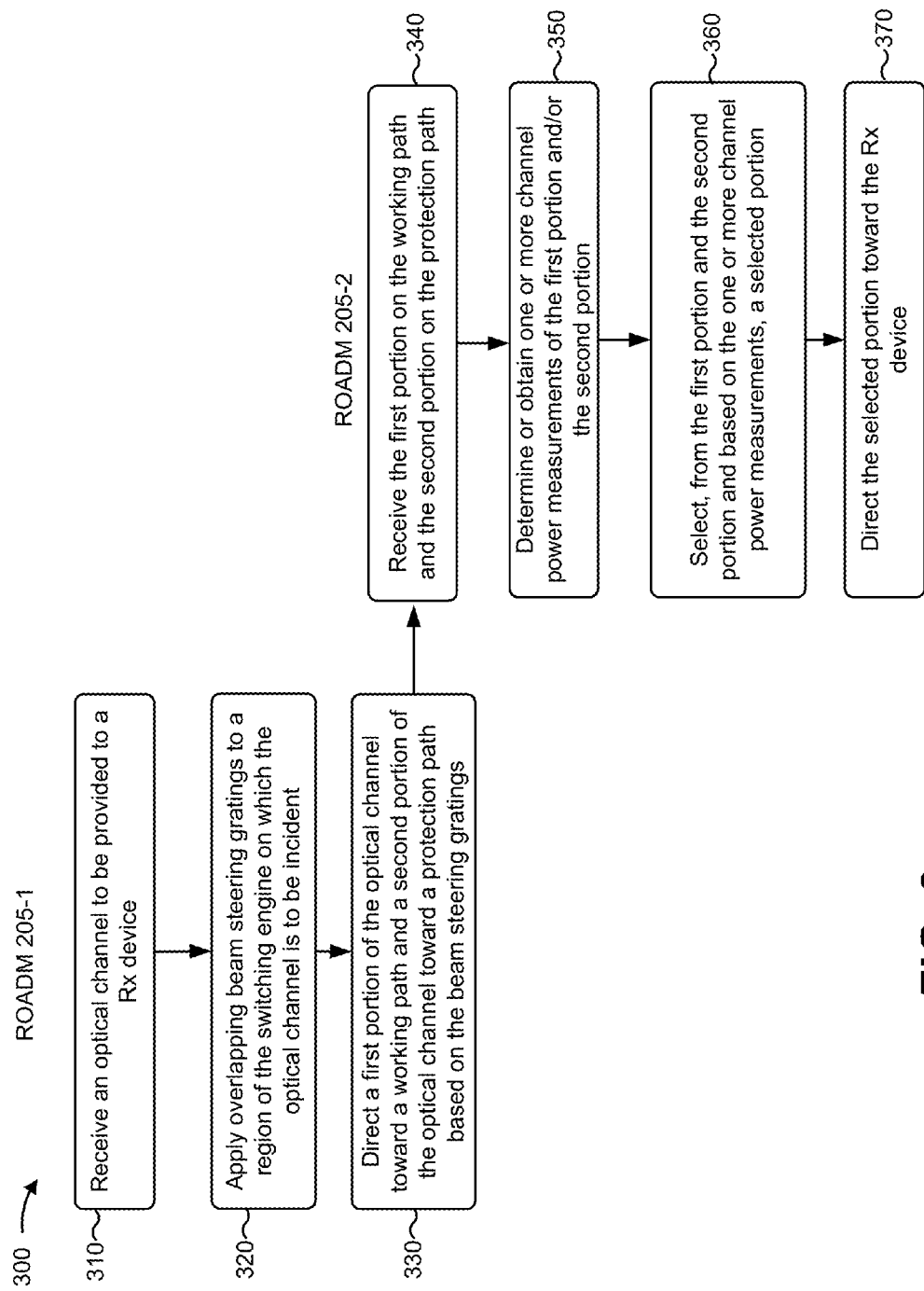
FIG. 3 is a flow chart of an example process for providing 1+1 optical path protection between two ROADMs.

FIG. 3 is a flow chart of an example process 300 for providing 1+1 optical transport layer protection in an optical network using programmable multicast beam steering gratings. In some implementations, one or more process blocks of FIG. 3 may be performed by ROADM 205 (e.g., M×N WSS 210 or 1×N WSS 225). In some implementations, one or more process blocks of FIG. 3 may be performed by another device or a group of devices separate from or including ROADM 205, such as a network administrator device.

As shown in FIG. 3, process 300 may include receiving an optical channel to be provided to a Rx device (block 310). For example, M×N WSS 210 of ROADM 205-1 may receive one or more channels (e.g., one or more optical channels) to be provided toward a Rx device. In some implementations, M×N WSS 210 may receive the channel from a Tx device. For example, the Tx device may generate the channel and may provide the channel to M×N WSS 210 (e.g., via input port 215). In some implementations, M×N WSS 210 may receive the channel from one or more other optical devices. For example, M×N WSS 210 may be an intermediate node in an optical path between an originating optical device and a Rx device. The channel may be associated with routing information identifying M×N WSS 210 and/or the Rx device, and M×N WSS 210 may use the routing information to determine that the channel is to be provided to ROADM 205-2 and/or the Rx device.

In some implementations, M×N WSS 210 may receive the channel from a particular Tx device and/or via a particular input port 215. For example, the particular Tx device may provide the channel to M×N WSS 210 via the particular input port 215. M×N WSS 210 may use a multicast beam steering grating to split the channel into portions and direct the optical signal to output ports 220 associated with a working path and a protection path. In this way, a switching engine of M×N WSS 210 provides 1+1 optical transport layer protection for an channel received via a single input port 215, which may be difficult or impossible with a multicast switch.

As further shown in FIG. 3, process 300 may include applying overlapping beam steering gratings to a region of the switching engine on which the optical channel is to be incident (block 320). For example, M×N WSS 210 of ROADM 205-1 may apply overlapping beam steering gratings to a region of switching array 250 on which the optical channel is to be incident. Switching array 250 may be included in a switching engine of M×N WSS 210. In some implementations, the optical channel may be spatially distributed based on wavelength before being projected to switching array 250, and the overlapping beam steering gratings may be applied to a region of switching array 250 corresponding to the bandwidth of the optical channel.

M×N WSS 210 may apply the overlapping beam steering gratings to cause the optical channel to be directed to a working path and a protection path, as described in more detail later. For example, the beam steering gratings may impart particular tilts to first and second portions of the optical channel to cause the first and second portions to be directed to respective output ports 220 associated with the working path and the protection path.

In some implementations, M×N WSS 210 may apply the overlapping beam steering gratings to a region of switching array 250 corresponding to one or more optical channels. For example, M×N WSS 210 may receive multiple optical channels, and may cause one or more of the multiple optical channels to be multicasted. When multiple optical channels are multicasted for 1+1 optical transport layer protection, the multiple optical channels need not be spectrally adjacent. That is, implementations described herein are capable of providing 1+1 optical transport layer protection for spectrally adjacent and spectrally non-adjacent optical channels.

As further shown in FIG. 3, process 300 may include directing a first portion of the optical channel toward a working path and a second portion of the optical channel toward a protection path based on the beam steering gratings (block 330). For example, ROADM 205-1 (e.g., M×N WSS 210 or 1×N WSS 225) may cause a first portion of the optical channel to be directed to output port 220 corresponding to the working path based on a first beam steering grating and a second portion of the optical channel to be directed to the output port corresponding to the protection path based a second beam steering grating overlapping with the first beam steering grating.

In some implementations, M×N WSS 210 may cause the optical channel to be directed to the working path and the protection path substantially simultaneously. In some implementations, the first and second portions of the optical signal directed to the working path and the protection path may be substantially equal in optical intensity. For example, approximately 50 percent of power of the optical channel may be directed to the working path, and a remainder of the power of the optical channel may be directed to the protection path. In some implementations, the first and second portions may not be equal in optical intensity. For example, the first portion may have a higher optical intensity than the second portion. In such a case, when M×N WSS 210 detects a service degradation with regard to the first portion, M×N WSS 210 may increase the optical intensity of the second portion in comparison to the first portion. In this way, M×N WSS 210 uses a high-intensity signal on the working path and a low-intensity signal on the protection path until a high-intensity signal on the protection path is needed. Thus, M×N WSS 210 improves optical network performance and increases reach of the optical channel.

In some implementations, M×N WSS 210 may direct a small portion (e.g., 1 percent, 3 percent, 5 percent, etc.) of the power of the optical channel to a photodetector of M×N WSS 210 or ROADM 205, which permits channel power measurement of the optical channel while providing 1+1 optical transport layer protection of the optical channel and the remaining power of the optical channel may be directed in substantially equal parts to the working path and the protection path.

In some implementations, M×N WSS 210 may direct respective first portions and second portions of multiple, different optical channels to the working path and the protection path. For example, when M×N WSS 210 provides 1+1 optical transport layer protection for multiple, different optical channels, M×N WSS 210 may multicast each of the multiple, different optical channels to the working path and the protection path or may have provisioned different working paths and protection paths for other channels to which the M×N WSS 210 provides 1+1 optical transport layer protection.

As further shown in FIG. 3, process 300 may include receiving the first portion on the working path and the second portion on the protection path (block 340), and determining or obtaining one or more channel power measurements of the first portion and/or the second portion (block 350). For example, ROADM 205-2 (e.g., M×N WSS 210 or 1×N WSS 225) may receive the first portion of the optical channel on the working path and the second portion of the optical channel on the protection path. ROADM 205-2 may be located in the optical network at the end of the working path and protection path where the optical channel may be dropped towards an Rx device. M×N WSS 210 may obtain one or more channel power measurements relating to the working path and/or the protection path. M×N WSS 210 may identify the working path and the protection path based on information received from ROADM 205-1 and/or a network administrator device. For example, ROADM 205-1 and/or the network administrator device may provide path information to ROADM 205-2 via an optical supervisory channel.

The channel power measurements may be used to determine a signal quality of the first and second portions of the optical channel received on the working path and the protection path.

In some implementations, ROADM 205-2 may use a photodetector to determine an optical channel power measurement. For example, ROADM 205-2 may multicast part of an optical channel received on the working path and/or the protection path to the photodetector (and the remainder may be directed to the Rx device) to determine an optical intensity of the optical channel received on the working path and/or the protection path. In this way, ROADM 205-2 determines an optical channel power measurement using an integrated photodetector, which reduces cost and complexity associated with the optical network by reducing a quantity of dedicated optical channel monitors (OCMs) to be implemented.

Additionally, or alternatively, ROADM 205-2 may include discrete OCMs for performing optical power monitoring to select between the working path and the protection path for routing to the Rx device. Additionally, or alternatively, other components of ROADM 205-2 may determine or be informed of which of the two paths to select and route to the Rx device.

An OCM includes a monitoring component capable of monitoring performance of an optical signal. For example, the OCM includes a device that determines an optical channel power measurement, a wavelength measurement, or an optical signal-to-noise ratio (OSNR) measurement for an optical fiber and/or an optical signal. The OCM may be external to ROADM 205. For example, the OCM may be connected to an optical line that is connected to ROADM 205, and may communicate an optical network measurement to controller 235.

As further shown in FIG. 3, process 300 may include selecting, from the first portion and the second portion and based on the one or more channel power measurements, a selected portion (block 360). For example, M×N WSS 210 may select, as a selected portion, either the first portion on the working path or the second portion on the protection path. In some implementations, M×N WSS 210 may select the selected portion based on the one or more channel power measurements. M×N WSS 210 may select, as a selected portion, the portion of the optical channel that is associated with better channel performance, and may route the selected optical signal toward the Rx device.

In some implementations, M×N WSS 210 may select the selected portion based on a default rule. For example, M×N WSS 210 may select the first portion as the selected portion unless an optical channel power measurement associated with the first portion on the working path does not satisfy a threshold.

In some implementations, M×N WSS 210 may switch between a working path and a protection path based on an optical signal from one of the optical paths being disrupted. For example, assume that M×N WSS 210 selects a working path from which to provide an optical channel to a Rx device, and assume that the optical channel from the working path is disrupted (e.g., based on a line break between ROADM 205-1 and ROADM 205-2, a device failure between ROADM 205-1 and ROADM 205-2, insufficient bandwidth, etc.). In such a case, M×N WSS 210 may determine that channel performance on the working path has degraded, and may select the protection path from which to provide the optical channel to the Rx device. Once service on the working path is no longer disrupted, M×N WSS 210 may use the working path as the selected path, or may continue to use the protection path until the protection path experiences a signal disruption. In this way, M×N WSS 210 improves network resilience by switching between optical paths based on performance of the optical paths.

As further shown in FIG. 3, process 300 may include directing the selected portion toward the Rx device (block 370). For example, ROADM 205-2 (e.g., M×N WSS 210 or 1×N WSS 225) may direct the selected portion of the optical channel to the Rx device from the corresponding path (e.g., the working path or the protection path). M×N WSS 210 may receive the optical channel via a first input port 215 associated with the working path and via a second input port 215 associated with the protection path. When M×N WSS 210 selects a selected path, M×N WSS 210 may route the optical channel from an input port 215 associated with the selected portion (i.e., the first input port 215 or the second input port 215) to an output port 220 associated with the Rx device. In such a situation, M×N WSS 210 may cause the portion of the optical channel other than the selected portion to be dropped, to be routed to a dump port, to be attenuated to zero power, or the like. In some implementations, M×N WSS 210 may use a phased array switching engine to provide the selected portion to the Rx device. For example, M×N WSS 210 may implement a beam steering grating to direct the selected portion from an input port 215 associated with the selected path to an output port 220 associated with the Rx device.

When using a programmable multicast switching engine, such as a phased array switching engine, with 1+1 protection, M×N WSS 210 may more quickly switch between paths in the event of a service disruption, and may reduce interruption of the optical channel optical signal when switching between paths. For example, assume that M×N WSS 210 determines that service on a working path has degraded. In that case, M×N WSS 210 may use the switching engine to switch from the working path to the protection path. Additionally, or alternatively, while switching from the working path to the protection path, M×N WSS 210 may continue to provide part of or all of the optical channel from the working path to the Rx device while switching to the protection path, which may reduce an interruption of the channel while switching.

In this way, a programmable multicast switching engine improves optical network resilience by providing a 1+1 optical protection scheme in the optical transport layer using multicast beam steering gratings. By using multicast beam steering gratings, a WSS eliminates the need for a passive splitter and/or a passive combiner external to ROADM 205 and simplifies implementation of ROADM 205. Furthermore, a recipient ROADM 205 may reduce interruption of an optical signal when switching between the working path and the protection path by using a programmable multicast switching engine.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4A:
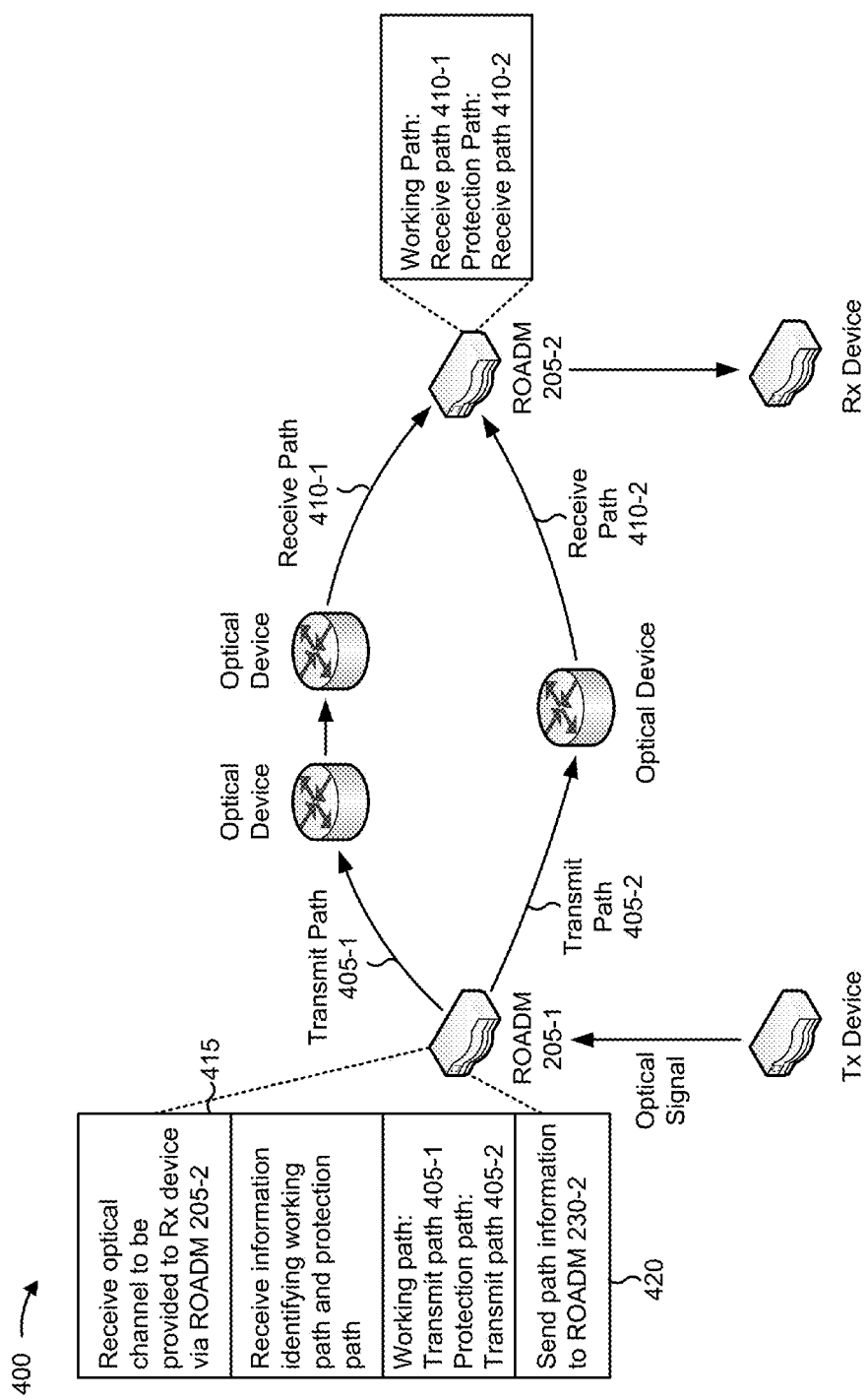
FIGS. 4A-4D are diagrams of an example implementation relating to the example process shown in FIG. 3.

FIGS. 4A-4D are diagrams of an example implementation 400 relating to example process 300 shown in FIG. 3. FIGS. 4A-4D show an example of providing 1+1 optical transport layer protection in an optical network using programmable multicast beam steering gratings. As shown in FIG. 4A, ROADM 205-1 may be associated with transmit paths 405-1 and 405-2, and ROADM 205-2 may be associated with receive paths 410-1 and 410-2. As shown, assume that ROADM 205-1 receives an optical signal from a Tx device en route to a Rx device.

As shown by reference number 415, ROADM 205-1 may receive an optical channel to be provided to the Rx device on a working path and on a protection path. As further shown, ROADM 205-1 may receive information identifying the working path and the protection path (e.g., from another ROADM 205, from a network administrator device, etc.). In some implementations, ROADM 205-1 may select the working path and the protection path for the optical channel based on path performance information associated with transmit path 405-1, transmit path 405-2, receive path 410-1, and/or receive path 410-2. As further shown, the information may indicate that transmit path 405-1 is to be used as the working path and transmit path 405-2 is to be used as the protection path.

As shown by reference number 420, ROADM 205-1 may provide the selected path information to ROADM 205-2 (e.g., via an optical supervisory channel, via a network administrator device, etc.). Assume that ROADM 205-2 receives the selected path information. As shown, based on the selected path information, ROADM 205-2 may determine that receive path 410-1 is to be used as the working path, and that receive path 410-2 is to be used as the protection path. Alternatively, ROADM 205-2 may not receive any path information and may select which path to use based on power measurements.

Figure 4B:
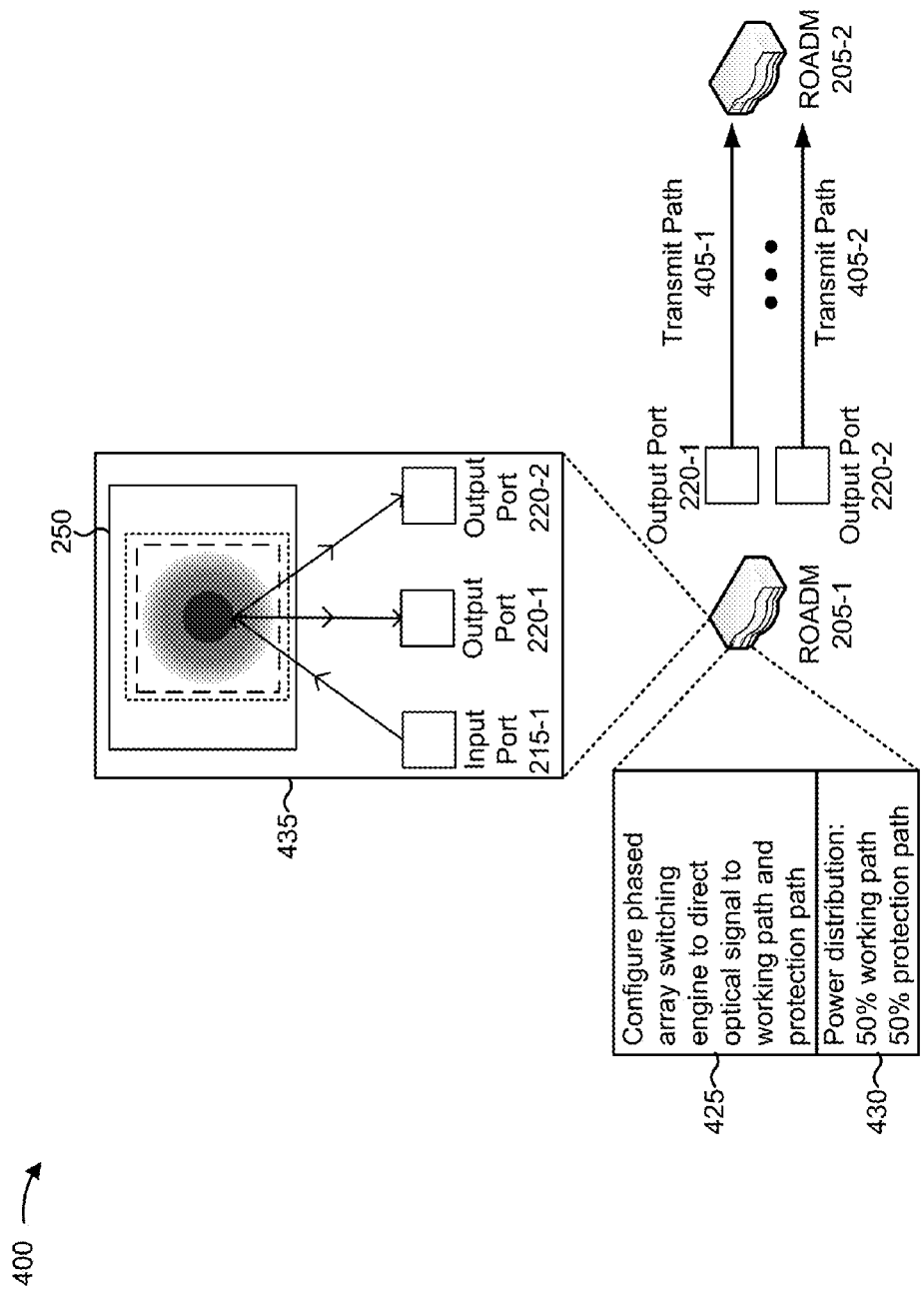

As shown in FIG. 4B, and by reference number 425, M×N WSS 210 may configure switching array 250 of a programmable multicast switching engine to multicast a first portion of the channel to the working path and a second portion of the optical channel to the protection path. As shown by reference number 430, M×N WSS 210 directs 50% of the channel power via the working path and 50% of the channel power via the protection path. As shown by reference number 435, to multicast the channel to the working path and the protection path, switching array 250 may direct a first portion of the optical signal to output port 220-1 and a second portion of the optical signal to output port 220-2. As further shown, output port 220-1 is associated with transmit path 405-1 (e.g., the working path), and output port 220-2 is associated with transmit path 405-2 (e.g., the protection path). As shown, assume that ROADM 205-2 selects the first portion as the selected portion to route to the Rx device (e.g., based on channel power measurements associated with the first portion and the second portion, based on a default rule, based on an instruction from ROADM 205-1 and/or a network administrator device, etc.).

Figure 4C:
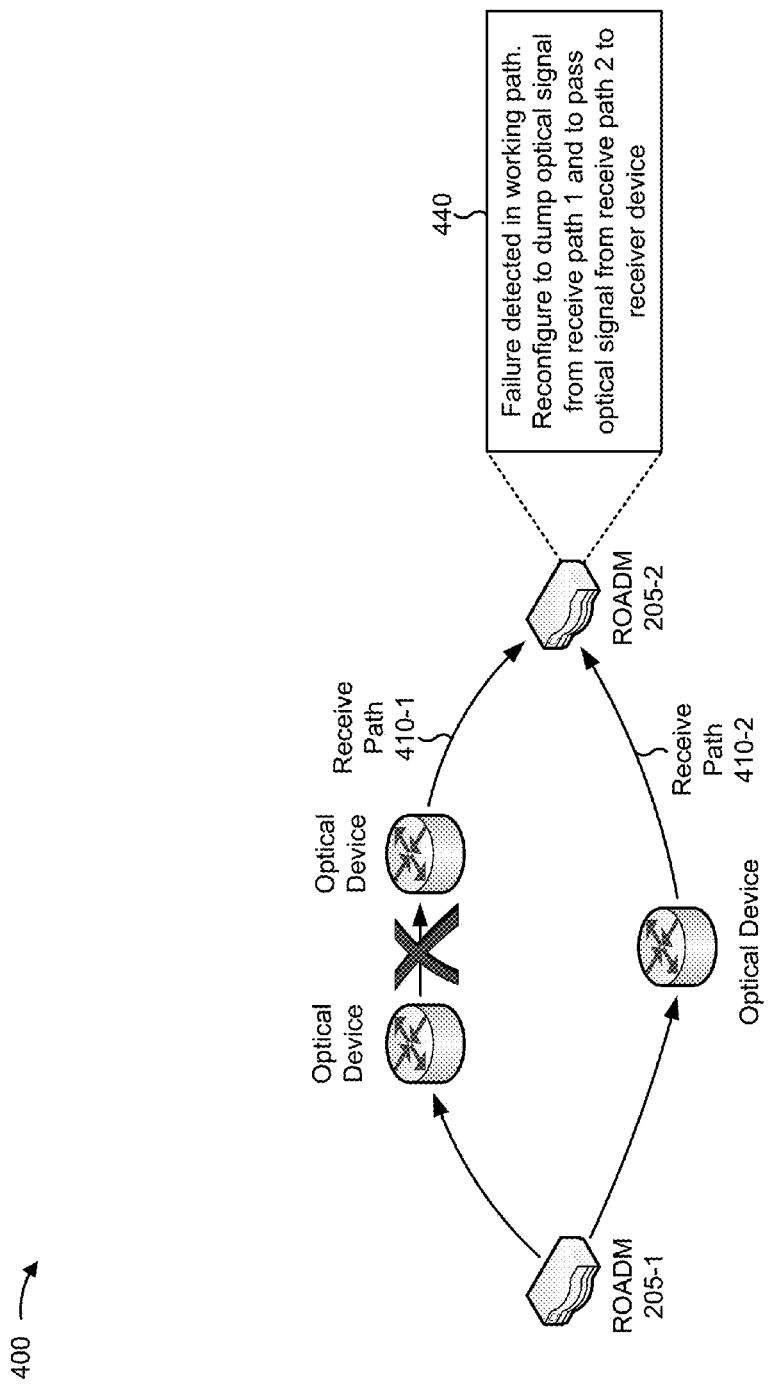

As shown in FIG. 4C, assume that a failure occurs in the working path (e.g., transmit path 405-1 and/or receive path 410-1). As shown by reference number 440, ROADM 205-2 may detect the failure in the working path. For example, ROADM 205-2 may determine that the failure has occurred using measurements obtained by one or more photodetectors and/or an OCM, as described in more detail in connection with FIGS. 4D, 5, and 6A-6C, below.

Figure 4D:
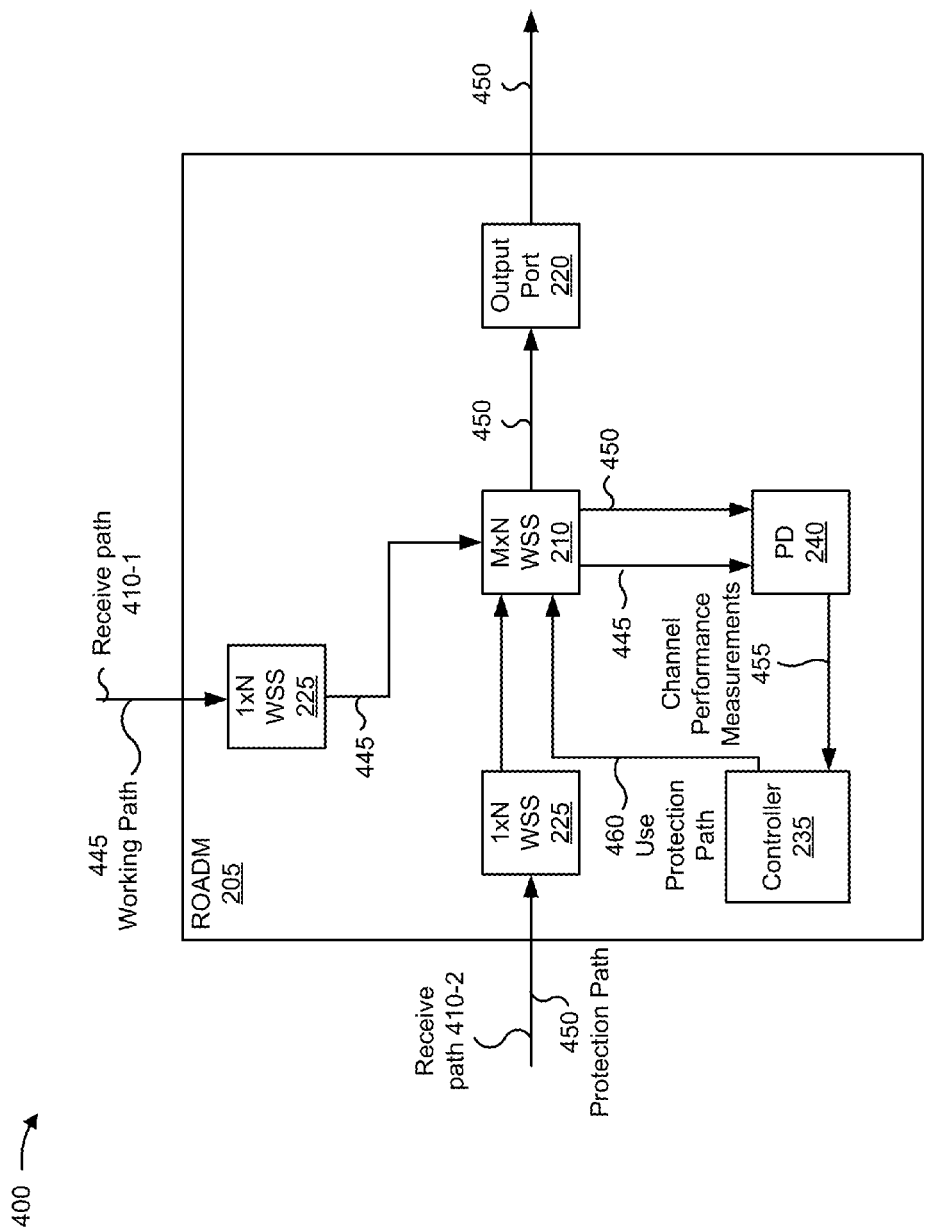

FIG. 4D shows an example of selecting a selected path based on channel performance information from photodetector 240. For the purpose of FIG. 4D, the first portion of the optical channel that is provided via the working path (e.g., receive path 410-1) is referred to as first portion 445, and the portion of the optical signal received via the protection path (e.g., receive path 410-2) is referred to as second portion 450.

As shown, a first 1×N WSS 225 in the northern direction may receive first portion 445 via receive path 410-1, and a second 1×N WSS 225 in the western direction may receive second portion 450 via receive path 410-2. As shown, the first and second 1×N WSS 225 may provide signals 445 and 450 to M×N WSS 210, and M×N WSS 210 may direct a small part of portions 445 and 450 to photodetector 240 (e.g., using one or more multicast beam steering gratings). In some implementations, the first and second 1×N WSS 225 may direct small parts of first portion 445 and second portion 450 to respective photodetectors 240. As shown by reference number 455, photodetector 240 provides channel power measurements to controller 230. The channel power measurements may include, for example, current values generated based on respective optical intensities of portions 445 and 450, as described in more detail in connection with FIGS. 5-6C, below. In some implementations, ROADM 230-2 may obtain the channel power measurements from a discrete OCM (i.e., an OCM other than photodetector 240), which may provide a faster and/or more accurate channel power measurement than photodetector 240.

As shown by reference number 460, based on the channel power measurements, controller 235 provides an instruction to cause M×N WSS 210 to provide second portion 450 to the Rx device as the selected portion of the optical channel. For example, the optical channel power measurements may indicate that an optical channel power associated with first portion 445 is inadequate, that first portion 445 has been disrupted, or the like. As shown, based on the instruction, M×N WSS 210 routes second portion 450 towards the Rx device via output port 220. For example, M×N WSS 210 may route second portion 450 to output port 220.

In this way, M×N WSS 210 facilitates 1+1 optical transport layer protection of channels using multicast beam steering gratings. Further, as described above, ROADM 205 uses photodetector 240 to determine channel power measurements by directing a small portion of the optical channel to photodetector 240, which may eliminate a need for an external OCM. Thus, ROADM 205 improves network resilience and reduces interruption when switching between working paths and protection paths.

As indicated above, FIGS. 4A-4D are provided merely as examples. Other examples are possible and may differ from what was described with regard to FIGS. 4A-4D.

Figure 5:
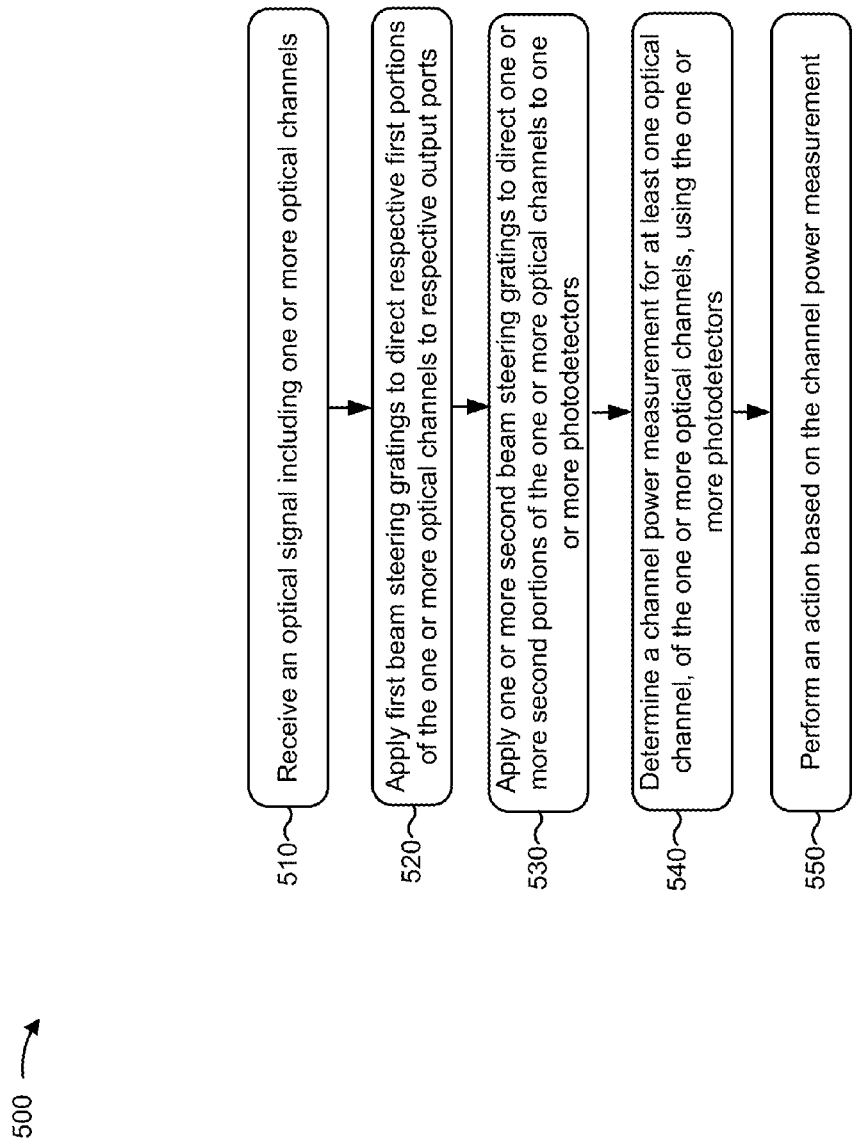
FIG. 5 is a flow chart of an example process for monitoring optical channel performance using an integrated photodetector and based on programmable multicast beam steering gratings.

FIG. 5 is a flow chart of an example process 500 for monitoring optical channel performance using an integrated photodetector based on programmable multicast beam steering gratings. In some implementations, one or more process blocks of FIG. 5 may be performed by ROADM 205 (e.g., M×N WSS 210 and/or 1×N WSS 225).

As shown in FIG. 5, process 500 may include receiving an optical signal including one or more optical channels (block 510). For example, ROADM 205 (e.g., M×N WSS 210 or 1×N WSS 225) may receive, via input port 215, an optical signal. M×N WSS 210 may receive the optical signal from a Tx device, from ROADM 205, or the like. In some implementations, the optical signal may include a set of wavelengths. For example, the optical signal may include an optical channel of a particular bandwidth. As another example, the optical signal may include a set of optical channels that are each associated with a different spectral slice of bandwidth. As yet another example, the optical signal may include a super-channel of multiple, different optical channels, or a super-channel group of multiple super-channels. In some implementations, M×N WSS 210 may receive the optical signal as a dispersed optical signal, or may disperse the optical signal to form the dispersed optical signal.

As further shown in FIG. 5, process 500 may include applying first beam steering gratings to direct respective first portions of the one or more optical channels to respective output ports (block 520). For example, ROADM 205 (e.g., M×N WSS 210, 1×N WSS 225, etc.) may apply first beam steering gratings to direct respective first portions of the one or more optical channels to respective output ports 220 for routing to destinations of the one or more optical channels. The respective first portions may include all of the power of the one or more optical channels, or may include a majority of the power of the one or more optical channels. For example, the first portions may include more than approximately 90 percent of the power of the one or more optical channels. In a case where the one or more optical channels are multicasted on a working path and a protection path, the first portions may include, for example, between approximately 45 percent and 50 percent of the one or more optical channels.

As further shown in FIG. 5, process 500 may include applying one or more second beam steering gratings to direct one or more second portions of the one or more optical channels to one or more photodetectors (block 530). For example, ROADM 205 (e.g., M×N WSS 210, 1×N WSS 225, etc.) may apply one or more second beam steering gratings to direct one or more second portions of the one or more optical channels to one or more photodetectors 240. In some implementations, the one or more second portions may be relatively small compared to a total power of the corresponding optical channel or channels (e.g., 30%, 10%, 5%, 3%, 1%, etc.)

In some implementations, M×N WSS 210 ROADM 205 may direct an entirety of the bandwidth of the optical signal one or more optical channels to photodetector 255 photodetector 240. Additionally, or alternatively, ROADM 205 may direct a portion of the bandwidth of the one or more optical channels to photodetector 240. For example, when the optical signal includes multiple, different optical channels, M×N WSS 210 may direct one or more of the optical channels to photodetector 240 (e.g., simultaneously, in sequence, etc.). In such a case, M×N WSS 210 may attenuate other optical channels, of the multiple, different optical channels, to cause optical power of the other optical channels to match optical power of the one or more of the optical channels.

In some implementations, M×N WSS 210 may direct different spectral bands of the optical signal to photodetector 240 at different times. For example, M×N WSS 210 may direct different optical channels to photodetector 240 at different, predetermined times (e.g., based on a regular time interval or an irregular time interval). As another example, M×N WSS 210 may direct different spectral bands to photodetector 240 based on an instruction from controller 235 and/or a network administrator device, or the like, as described in more detail in connection with FIGS. 6A-6C. Additionally, or alternatively, M×N WSS 210 may direct multiple, different optical channels to corresponding photodetectors 240.

As further shown in FIG. 5, process 500 may include determining a channel power measurement for at least one optical channel, of the set of optical channels, using the one or more photodetectors (block 540). For example, M×N WSS 210 may determine a channel power measurement for at least one optical channel, of the set of optical channels, using photodetector 240. M×N WSS 210 may determine the channel power measurement based on a current value generated by photodetector 240. For example, photodetector 240 may generate a current value based on an intensity or power level of the at least one optical channel, and may transmit the current value to controller 235. Controller 235 may determine the channel power measurement corresponding to the at least one optical channel based on the current value. For example, controller 235 may store information associating channel power measurements with current values, and may determine the channel power measurement based on the stored information.

As further shown in FIG. 5, process 500 may include performing an action based on the channel power measurement (block 550). For example, M×N WSS 210 may perform an action based on the channel power measurement. In some implementations, M×N WSS 210 may select a working path and/or a protection path based on the channel power measurement, as described in more detail in connection with FIG. 3, above. Additionally, or alternatively, M×N WS S 210 may switch from a selected portion of an optical channel received on a working path and a protection path, to the other portion of the optical channel received on the working path and the protection path, as also described in more detail in connection with FIG. 3. Additionally, or alternatively, M×N WSS 210 may provide information to a network administrator device and/or other ROADMs 205 and/or optical devices based on the channel power measurement.

In this way, M×N WSS 210 determines a channel power measurement associated with the optical signal based on an electrical value generated by photodetector 240 and using a multicast beam steering grating, which may eliminate the need for an external OCM, thereby reducing cost and simplifying ROADM 205 and/or the optical network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
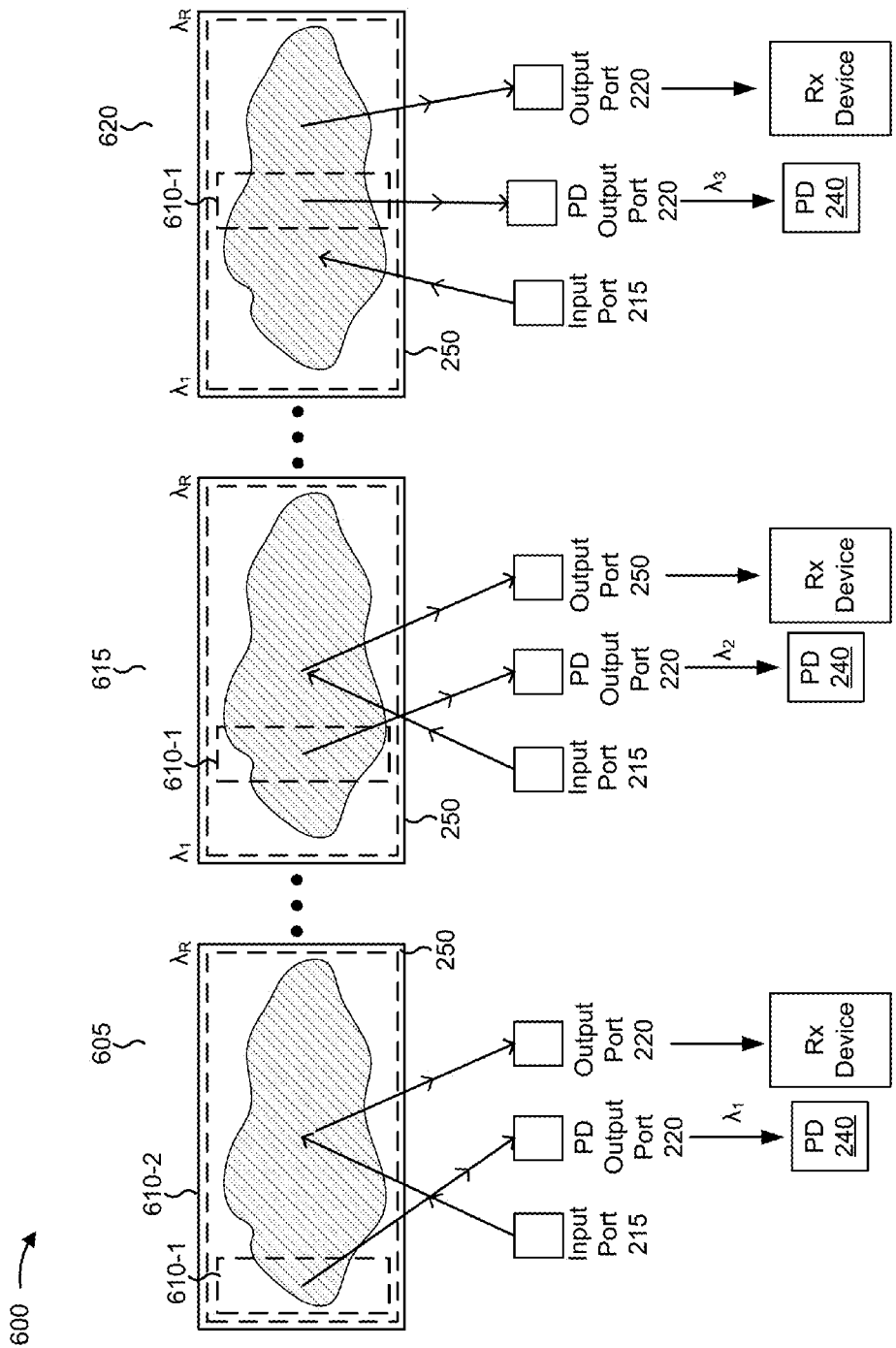
FIGS. 6A-6C are diagrams of an example implementation relating to the example process shown in FIG. 5.
Figure 6B:
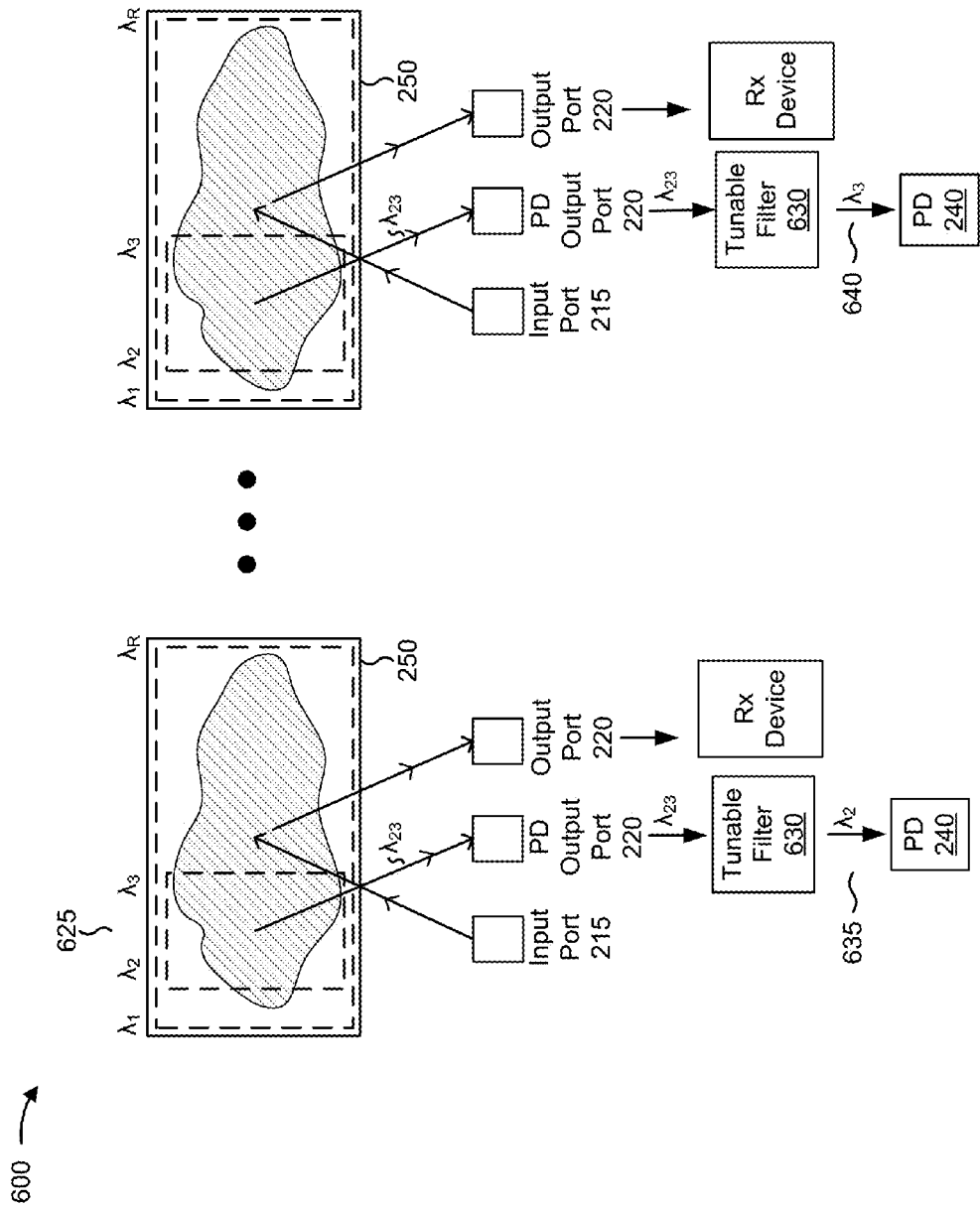
Figure 6C:
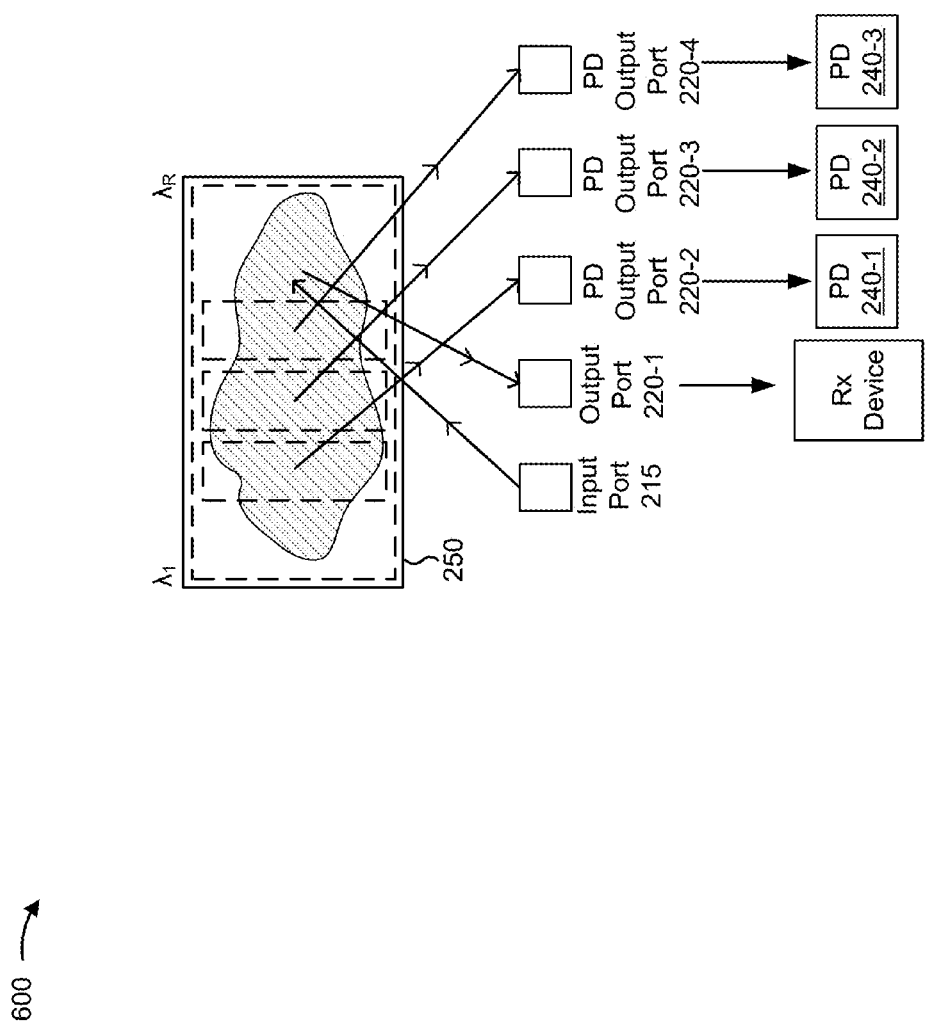

FIGS. 6A-6C are diagrams of an example implementation 600 relating to example process 500 shown in FIG. 5. FIGS. 6A-6C show an example of monitoring optical channel performance using an integrated photodetector based on programmable multicast beam steering gratings. For the purpose of FIGS. 6A-6C, an output port 220 that is connected to photodetector 240 is shown as "PD output port 220."

As shown in FIG. 6A, switching array 250 of M×N WSS 210, may receive a distributed optical signal (shown as an irregularly-shaped area with a diagonal fill pattern) from input port 215. As shown, the distributed optical signal includes a bandwidth of $\lambda_1$ through $\lambda_R$ spanning, for example, all of the C-band or all of the L-band or both. As shown by reference number 605, the switching array may implement gratings 610-1 and 610-2. For example, controller 235 may cause switching array 250 to implement gratings 610-1 and 610-2. As further shown, grating 610-1 directs a portion of a first channel $\lambda_1$ to PD output port 220 that connects to photodetector 240, and grating 610-2 directs an entirety of the optical signal, including the first channel, to output port 220 to be outputted to the Rx device. For example, each spectral band at which grating 610-1 is implemented may be associated with a different optical channel, a different portion of an optical channel, a different super-channel, or the like.

As shown by reference number 615, grating 610-1 may be applied to a different region of the switching array to cause a different channel (i.e., $\lambda_2$) to be directed to photodetector 240 for measurement. For example, based on an instruction from controller 235, switching array 250 may move grating 610-1 along the bandwidth of the distributed optical signal channel by channel or in smaller steps of bandwidth (e.g. 2 GHz). As shown by reference number 620, switching array 250 may continue to move grating 610-1 along the bandwidth of the distributed optical signal to direct a third channel (e.g., $\lambda_3$) to photodetector 240. In this way, the programmable multicast switching engine can cause different channels of an optical signal to be monitored using a single photodetector 240, which may use less space and/or may be less expensive than implementing a tunable wavelength filter and/or multiple photodetectors 255, as described below.

As shown in FIG. 6B, and by reference number 625, in some cases, switching array 250 may implement a grating to cover a broader spectral band than in FIG. 6A. Here, the spectral band includes $\lambda_2$ through $\lambda_3$. As further shown, in some cases, ROADM 205 may include a tunable filter 630. Tunable filter 630 may include a tunable wavelength filter, such as a liquid crystal tunable filter, a thin-film tunable filter, a bandpass filter, an acousto-optic tunable filter, a linear-variable tunable filter, or the like. As shown, tunable filter 630 may receive the first portion of the distributed optical signal, including $\lambda_2$ through $\lambda_3$. As shown by reference number 635, tunable filter 630 may filter the first portion of the optical signal, and may pass $\lambda_2$. For example, controller 235 may cause tunable filter 630 to pass $\lambda_2$ to photodetector 240 so that controller 235 can determine a power level associated with $\lambda_2$.

As shown by reference number 640, in some cases, tunable filter 630 may pass a different wavelength than $\lambda_2$ (e.g., $\lambda_3$). For example, tunable filter 630 may receive an instruction from controller 235 to pass $\lambda_3$ so that controller 235 can determine a power level associated with $\lambda_3$. In this way, controller 235 causes tunable filter 630 to pass different spectral bands of a distributed optical signal, thereby facilitating monitoring of the different spectral bands based on current values from photodetector 240. In some implementations, tunable filter 630 may be capable of being adjusted more quickly than the switching array. In such a case, tunable filter 630 may reduce time required to monitor different spectral bands of the optical signal.

As shown in FIG. 6C, in some implementations, ROADM 205 may include multiple, different photodetectors 240. For example, in FIG. 6C, ROADM 205 includes photodetectors 240-1 through 240-3. In such a case, the switching array may implement multiple beam steering gratings corresponding to the multiple, different photodetectors 240, and may direct a different channel of the distributed optical signal to each of the multiple, different photodetectors 240. Here, the second portion of the distributed optical signal is directed to output port 220-1 to be outputted to the Rx device, and the spectral bands are directed to respective PD output ports 220-2 through 220-4, corresponding to photodetectors 240-1 through 240-3. In this way, ROADM 205 may monitor a larger spectral bandwidth of the optical signal at a given time while maintaining a higher level of detail than when using a single photodetector 240 with a single beam steering grating.

As indicated above, FIGS. 6A-6C are provided merely as examples. Other examples are possible and may differ from what was described with regard to FIGS. 6A-6C.

Implementations described herein permit a ROADM to determine channel performance information based on an integrated photodetector, and to provide 1+1 protection in the optical transport layer based on channel performance information, using programmable multicast beam steering gratings. By providing 1+1 protection in the optical transport layer, the ROADM improves network resilience and reduces time spent switching from a working path to a protection path. By using an integrated performance monitor, the ROADM may reduce cost of determining channel performance information, and may reduce or eliminate the need for an external optical channel monitor.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software, except when used in connection with wavelength components.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "group" or "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

This patent application is related to U.S. patent application Ser. No. 15/136,675, filed Apr. 22, 2016, which is incorporated, in its entirety, herein by reference.

What is claimed is:

1. A method, comprising:
receiving, by a switching engine, an optical signal that includes a channel;
applying, by the switching engine, a first beam steering grating to a first region of the switching engine on which the channel is incident to direct a first portion of the channel to a first output port; and
applying, by the switching engine, one or more second beam steering gratings to a second region that is included in the first region to direct at least one of:
a second portion of the channel to a second output port for the purpose of protection, or
a third portion of the channel to a photodetector for the purpose of optical channel monitoring,
the third portion to be approximately less, in power, than 10 percent of the channel.

2. The method of claim 1, where applying the one or more second beam steering gratings comprises:
applying a plurality of second beam steering gratings to direct a plurality of third portions of the channel to one or more photodetectors,
the one or more photodetectors including the photodetector.

3. The method of claim 1, where the second portion is approximately equal in power to the first portion.

4. The method of claim 1 where applying, by the switching engine, a first beam steering grating includes applying the first beam steering grating to a region of a phased array and where applying, by the switching engine, one or more second beam steering gratings includes applying the second beam steering gratings to the region of the phased array.

5. The method of claim 1, where the first output port is associated with a first optical path; and
where the second output port is associated with a second optical path,
the first optical path and the second optical path to terminate at the same device.

6. The method of claim 1, where the photodetector is included in the switching engine.

7. The method of claim 1, where the optical channel monitoring is dynamic wavelength dependent optical channel monitoring integrated within the switching engine.

8. A method, comprising:
receiving, by an optical device, a first optical signal and a second optical signal,
the first optical signal including a first portion of a channel and being received on a first port, and
the second optical signal including a second portion of the channel and being received on a second port;
measuring, by the optical device, a power level of at least one of the first portion or the second portion;
selecting, based on the power level, one of the first portion or the second portion, as a selected portion, to be directed by the optical device to an output port of the optical device; and
directing, based on a beam steering grating, the selected portion to the output port.

9. The method of claim 8, where the first portion and the second portion are approximately equal in power.

10. The method of claim 8, where measuring, by the optical device, a power level of at least one of the first portion or the second portion further comprising:
directing a particular portion of the first portion or the second portion to one or more photodetectors,
the particular portion having between approximately 1 percent and 10 percent of an optical power of the first portion or the second portion; and
determining the power level based on directing the particular portion to the one or more photodetectors.

11. The method of claim 8, where the first portion is the selected portion; and
where the method further comprises:
attenuating the second portion to cause the second portion not to be outputted by the optical device.

12. The method of claim 8, where the first port is associated with a working path of an optical network; and
where the second port is associated with a protection path of the optical network.

13. The method of claim 8, further comprising:
determining that a power level of the selected portion does not satisfy a threshold; and
directing another portion, of the first portion and the second portion, other than the selected portion, to the output port.

14. The method of claim 13, further comprising:
increasing a power level of the other portion based on determining that the power level of the selected portion does not satisfy the threshold.

15. A method, comprising:
receiving, by a switching engine, an optical signal including one or more optical channels;
applying, by the switching engine, one or more first beam steering gratings to direct one or more respective first portions of the one or more optical channels to respective output ports;
applying, by the switching engine, one or more second beam steering gratings to direct one or more second portions of the one or more optical channels to one or more photodetectors for the purpose of optical channel monitoring;
determining, by the switching engine, a channel power measurement for at least one optical channel, of the one or more optical channels, using the one or more photodetectors;
receiving, by the switching engine, another optical signal including the one or more optical channels; and
selecting, by the switching engine and based on the channel power measurement, one of the optical signal or the other optical signal to be directed to an output port of the switching engine.

16. The method of claim 15, where the applying the one or more second beam steering gratings comprises:
applying the one or more second beam steering gratings to direct respective second portions of each of the one or more optical channels to the one or more photodetectors.

17. The method of claim 16, further comprising:
filtering the respective second portions to cause a second portion, of the respective second portions, corresponding to a particular one of the one or more optical channels, to reach the one or more photodetectors.

18. The method of claim 15, where applying the one or more second beam steering gratings comprises:
applying a second beam steering grating to direct a second portion, of the one or more second portions, corresponding to one of the one or more optical channels to the one or more photodetectors.

19. The method of claim 15, where applying the one or more first beam steering gratings comprises:
applying the one or more first beam steering gratings to a first region of the switching engine on which the one or more optical channels is incident; and
where applying the one or more second beam steering gratings comprises:
applying the one or more second beam steering gratings to a second region that is included in the first region.

20. The method of claim 15, where the optical channel monitoring is dynamic wavelength dependent optical channel monitoring integrated within the switching engine.

* * * * *